US012626077B2

(12) United States Patent
Singh et al.

(10) Patent No.: US 12,626,077 B2
(45) Date of Patent: May 12, 2026

(54) MANAGING LIFECYCLE OF PRODUCTS IN FACILITIES

(71) Applicant: HONEYWELL INTERNATIONAL INC., Charlotte, NC (US)

(72) Inventors: Ankit Singh, Apex, NC (US); Lakshminarayana Paila, Knoxville, TN (US); Zillery Fortner, Florence (IT); Waad Subber, Niskayuna, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/401,720

(22) Filed: Jan. 2, 2024

(65) Prior Publication Data

US 2025/0217611 A1      Jul. 3, 2025

(51) Int. Cl.
*G06K 7/10* (2006.01)

(52) U.S. Cl.
CPC ................................. *G06K 7/10366* (2013.01)

(58) Field of Classification Search
CPC ......... G06K 7/10366; G06K 7/00; G06K 7/10
See application file for complete search history.

(56) References Cited

U.S. PATENT DOCUMENTS

| | | | | |
|---|---|---|---|---|
| 2020/0074257 A1* | 3/2020 | Leitermann | ............. | H04W 4/35 |
| 2021/0248289 A1* | 8/2021 | Fasano | .................... | G05B 17/02 |
| 2022/0245572 A1* | 8/2022 | Kamarchik | ........ | G06Q 30/0202 |

FOREIGN PATENT DOCUMENTS

CN          110033064 A      7/2019

OTHER PUBLICATIONS

Vuemed, VUETRACK-UDI, 5 pages. https://vuemed.com/vuetrack-udi-rfid-tag-encoding/.
Medtech Plus, Blockchain: Empowered Quality for Medical Device, Swiss Medtech Expo 2021. https://www.medtech.plus/en/c/blockchain-empowered-quality-for-medical-device.3306.
Parker, Embedding RFID Tags within the Molded Components of Medical Devices, 8 Pages. https://www.parker.com/content/dam/Parker-com/Literature/Composite-Sealing-Systems-Division/22744-RFID-Tech-Bulletin.pdf.
Fujitsu, Fujitsu RFID and Sensor Solution for Medical Device Traceability, Aug. 2015, 2 Pages. https://www.fujitsu.com/us/Images/FUJITSU%20RFID%20for%20Medical%20Device%20Traceability.pdf.
InVita Healthcare Technologies, UDITracker, 14 pages. https://www.invitahealth.com/solutions/tissue-implant-explant-management/uditracker/.
Sarah Amsler, RFID (radio frequency identification), TechTarget. https://www.techtarget.com/iotagenda/definition/RFID-radio-frequency-identification#:~:text=The%20RFID%20reader%20is%20a,in%20the%20RFID%20tag%20itself.
P.Consani, UDI System and RFID Technology, IoT, Lab—Tertium Cloud Blog, 11 pages. https://iotlab.tertiumcloud.com/2021/02/24/udi-system-and-rfid/.

* cited by examiner

*Primary Examiner* — Matthew Mikels
(74) *Attorney, Agent, or Firm* — ALSTON & BIRD LLP

(57) ABSTRACT

Examples techniques for managing lifecycle of products in facilities are described. A current location of a product in a facility is determined based on a signal received from a RFID tag associated with the product. Further, a data indicative of physical conditions at the current location is received from one or more sensors installed at the current location. Data corresponding to signal received from RFID tag, and the data received from the one or more sensors are recorded in a dataset against a UI of the product. The UI is linked to the RFID tag. Data recorded in the dataset may be analyzed to identify an anomaly during a stage of a lifecycle of the product in the facility.

20 Claims, 9 Drawing Sheets

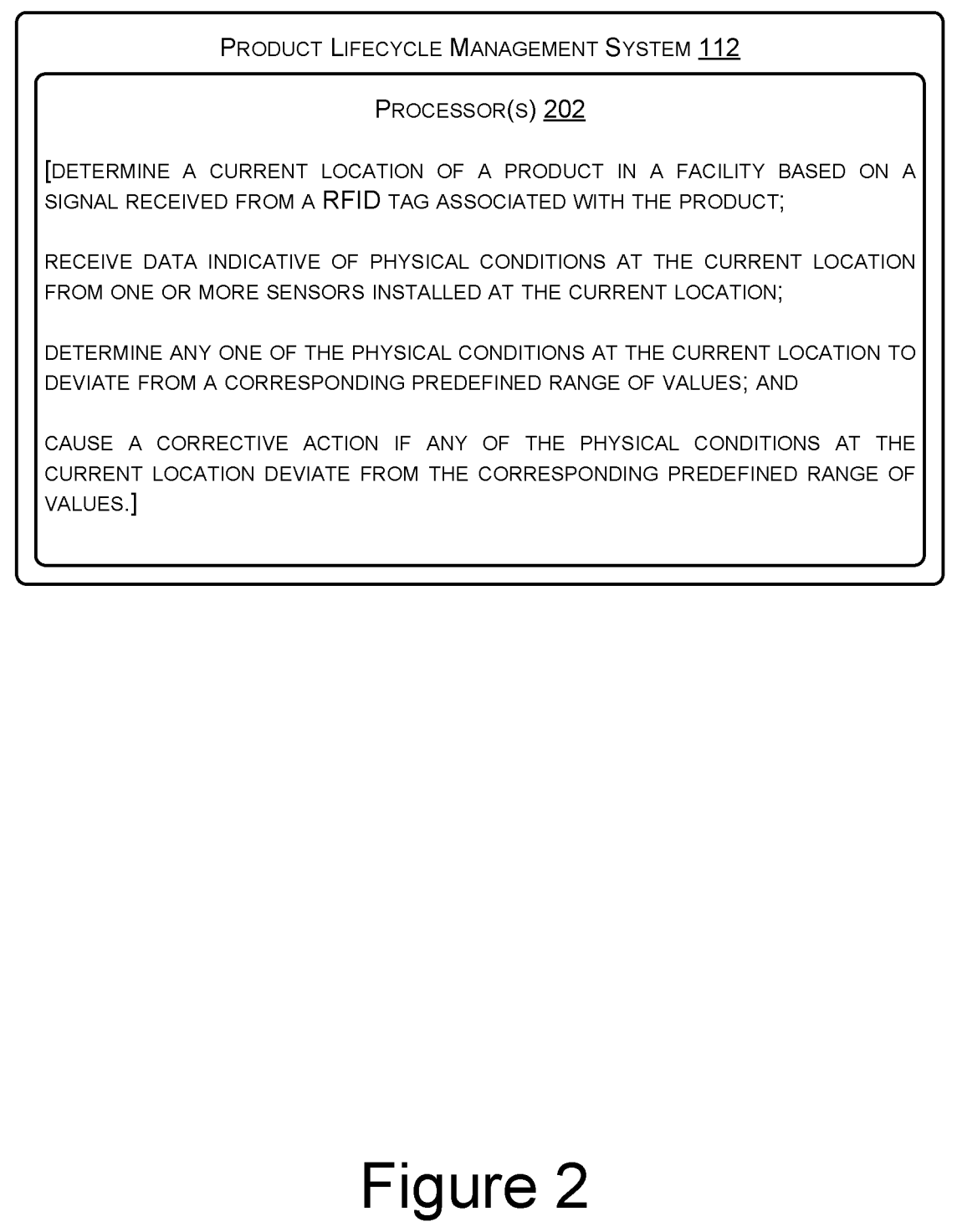

PRODUCT LIFECYCLE MANAGEMENT SYSTEM 112

PROCESSOR(S) 202

[DETERMINE A CURRENT LOCATION OF A PRODUCT IN A FACILITY BASED ON A SIGNAL RECEIVED FROM A RFID TAG ASSOCIATED WITH THE PRODUCT;

RECEIVE DATA INDICATIVE OF PHYSICAL CONDITIONS AT THE CURRENT LOCATION FROM ONE OR MORE SENSORS INSTALLED AT THE CURRENT LOCATION;

DETERMINE ANY ONE OF THE PHYSICAL CONDITIONS AT THE CURRENT LOCATION TO DEVIATE FROM A CORRESPONDING PREDEFINED RANGE OF VALUES; AND

CAUSE A CORRECTIVE ACTION IF ANY OF THE PHYSICAL CONDITIONS AT THE CURRENT LOCATION DEVIATE FROM THE CORRESPONDING PREDEFINED RANGE OF VALUES.]

Figure 2

600

RECEIVING, BY A PRODUCT LIFECYCLE MANAGEMENT SYSTEM (PLMS), A FIRST DATA FROM AN RFID READER, WHEREIN THE FIRST DATA CORRESPONDS TO PLURALITY OF SIGNALS RECEIVED BY THE RFID READER DURING AT LEAST ONE STAGE OF THE LIFECYCLE OF A PRODUCT IN A FACILITY FROM A RFID TAG COUPLED TO THE PRODUCT, WHEREIN THE PLURALITY OF SIGNALS IS INDICATIVE OF AT LEAST A CURRENT LOCATION OF THE PRODUCT WITHIN THE FACILITY 602

IDENTIFYING, BY THE PLMS, BASED ON THE CURRENT LOCATION OF THE PRODUCT AND PRE-STORED INFORMATION RELATING TO LOCATIONS DESIGNATED WITHIN THE FACILITY FOR EACH OF THE AT LEAST ONE STAGE OF THE LIFECYCLE OF THE PRODUCT, A CURRENT STAGE OF THE LIFECYCLE OF THE PRODUCT 604

RECEIVING, BY THE PLMS, A SECOND DATA INDICATIVE OF PHYSICAL CONDITIONS RELATING TO THE CURRENT STAGE AT A DESIGNATED LOCATION CORRESPONDING TO THE CURRENT LOCATION OF THE PRODUCT FROM ONE OR MORE SENSORS INSTALLED AT THE DESIGNATED LOCATION 606

CORRELATING THE FIRST DATA AND THE SECOND DATA TO IDENTIFY AN ANOMALY RELATING TO THE AT LEAST ONE STAGE OF THE LIFECYCLE 608

Figure 6

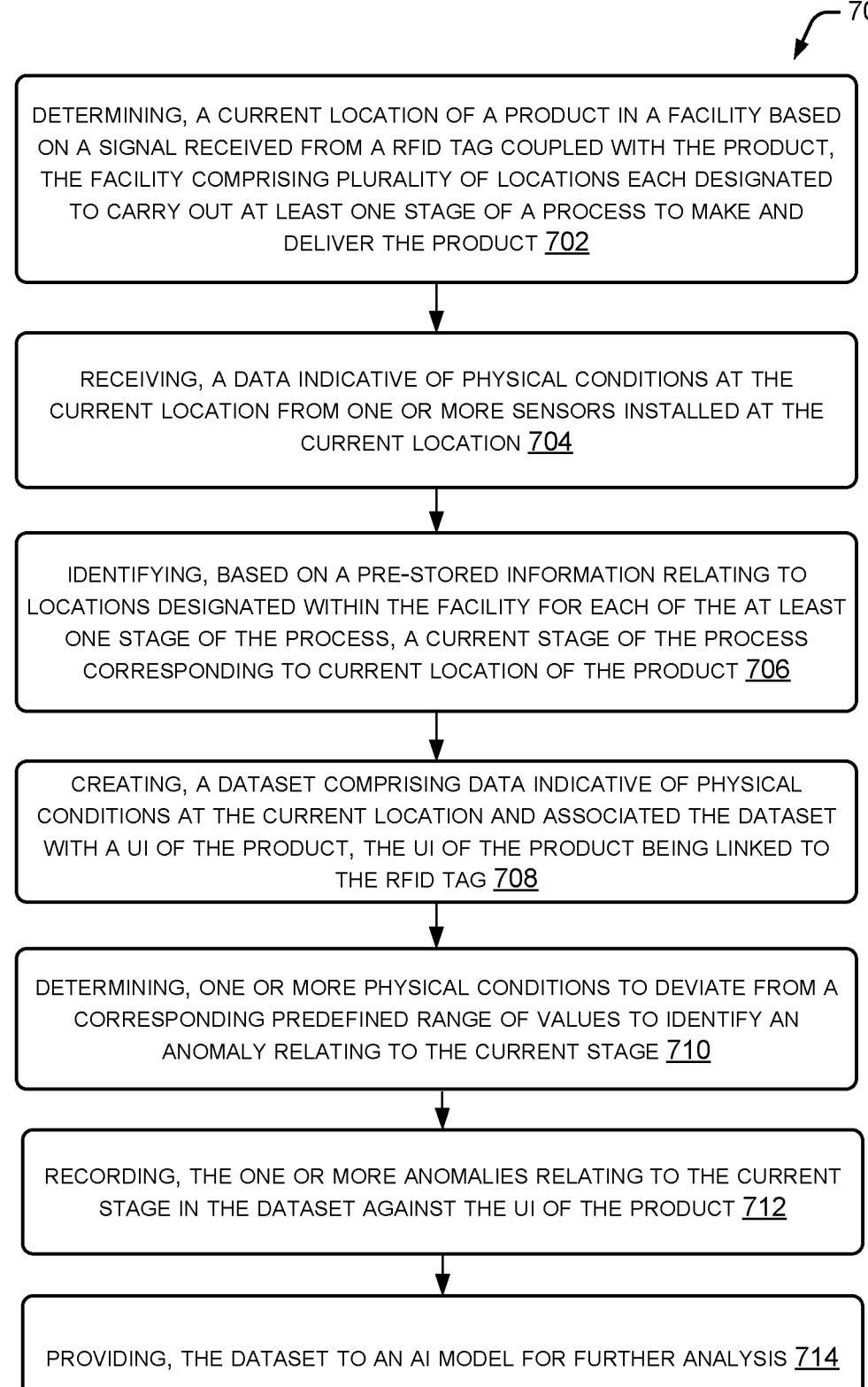

700

DETERMINING, A CURRENT LOCATION OF A PRODUCT IN A FACILITY BASED ON A SIGNAL RECEIVED FROM A RFID TAG COUPLED WITH THE PRODUCT, THE FACILITY COMPRISING PLURALITY OF LOCATIONS EACH DESIGNATED TO CARRY OUT AT LEAST ONE STAGE OF A PROCESS TO MAKE AND DELIVER THE PRODUCT 702

RECEIVING, A DATA INDICATIVE OF PHYSICAL CONDITIONS AT THE CURRENT LOCATION FROM ONE OR MORE SENSORS INSTALLED AT THE CURRENT LOCATION 704

IDENTIFYING, BASED ON A PRE-STORED INFORMATION RELATING TO LOCATIONS DESIGNATED WITHIN THE FACILITY FOR EACH OF THE AT LEAST ONE STAGE OF THE PROCESS, A CURRENT STAGE OF THE PROCESS CORRESPONDING TO CURRENT LOCATION OF THE PRODUCT 706

CREATING, A DATASET COMPRISING DATA INDICATIVE OF PHYSICAL CONDITIONS AT THE CURRENT LOCATION AND ASSOCIATED THE DATASET WITH A UI OF THE PRODUCT, THE UI OF THE PRODUCT BEING LINKED TO THE RFID TAG 708

DETERMINING, ONE OR MORE PHYSICAL CONDITIONS TO DEVIATE FROM A CORRESPONDING PREDEFINED RANGE OF VALUES TO IDENTIFY AN ANOMALY RELATING TO THE CURRENT STAGE 710

RECORDING, THE ONE OR MORE ANOMALIES RELATING TO THE CURRENT STAGE IN THE DATASET AGAINST THE UI OF THE PRODUCT 712

PROVIDING, THE DATASET TO AN AI MODEL FOR FURTHER ANALYSIS 714

Figure 7

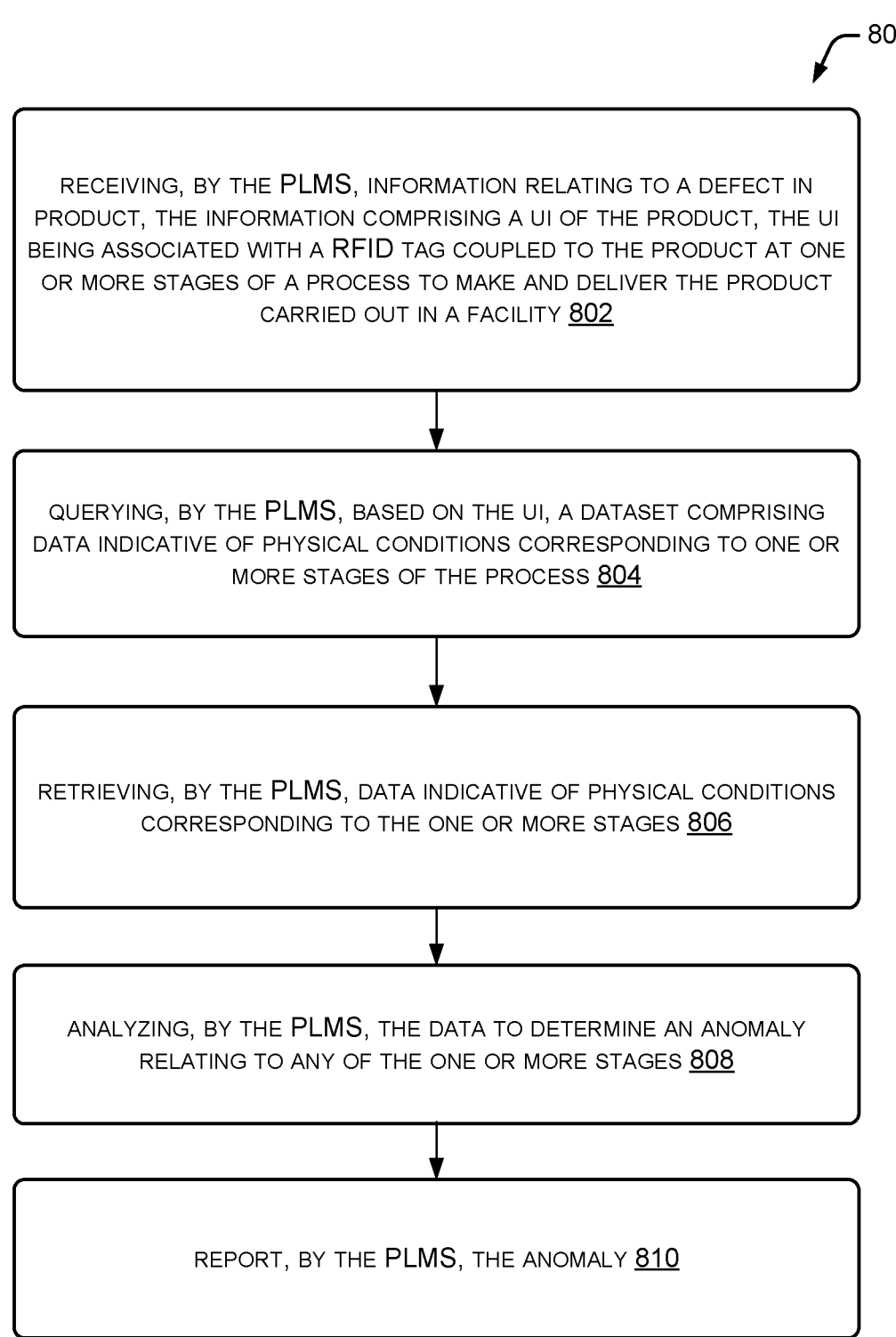

800

RECEIVING, BY THE PLMS, INFORMATION RELATING TO A DEFECT IN PRODUCT, THE INFORMATION COMPRISING A UI OF THE PRODUCT, THE UI BEING ASSOCIATED WITH A RFID TAG COUPLED TO THE PRODUCT AT ONE OR MORE STAGES OF A PROCESS TO MAKE AND DELIVER THE PRODUCT CARRIED OUT IN A FACILITY 802

QUERYING, BY THE PLMS, BASED ON THE UI, A DATASET COMPRISING DATA INDICATIVE OF PHYSICAL CONDITIONS CORRESPONDING TO ONE OR MORE STAGES OF THE PROCESS 804

RETRIEVING, BY THE PLMS, DATA INDICATIVE OF PHYSICAL CONDITIONS CORRESPONDING TO THE ONE OR MORE STAGES 806

ANALYZING, BY THE PLMS, THE DATA TO DETERMINE AN ANOMALY RELATING TO ANY OF THE ONE OR MORE STAGES 808

REPORT, BY THE PLMS, THE ANOMALY 810

Figure 8

MANAGING LIFECYCLE OF PRODUCTS IN FACILITIES

BACKGROUND

A large variety of products, ranging from medical devices to consumable items are manufactured for various purposes, with each of the products being manufactured following a process that is generally predefined.

A manufacturing process of a product is generally carried out at a facility, such as a manufacturing plant and a finished product is delivered to the market/consumer. The manufacturing process may include one or more manufacturing stages, such as production, and testing. Other than the various stages of manufacturing, an overall process to deliver the product for use may also involve post-manufacturing activities like packaging and distribution that may also be carried out at the facility.

To ensure a predefined quality of the product, each activity needs to be carried out in accordance with a standard operating procedure (SOP). For a given product, the SOP may define conditions and/or constraints to carry out the activities at a stage of the process to manufacture and deliver the product. For example, a SOP for testing a particular model of an X-ray machine may define that the machine is to be tested using wavelengths not exceeding 10 nanometers. Similarly, a SOP for a stage of preparation of a medical formulation may define ambient conditions under which constituents of the medical formulation are to be stored and mixed.

However, various stages of the process, such as manufacturing or testing may be susceptible to deviations from the SOP. In some cases, such deviations may lead to an anomaly in the product, lowering the quality of the product or decreasing the life span of the product, as the case may be. When deployed in use, such a product may need to be recalled before the expected time of failure or expiration time of the product.

Thus, the various stages of the product delivery process or the lifecycle of the product may be managed to identify deviations. Deviations, if identified, may be addressed by implementing corrective actions. Various corrective actions, such as discarding a product, carrying out a process of maintenance or optimization of the expected time of failure or expiration time of a device to avert situations that may result in recall of the device, may be implement.

SUMMARY

Various embodiments of systems and methods for managing lifecycle of a product in a facility are described herein.

The details of some embodiments of the subject matter described in this specification are set forth in the accompanying drawings and the description below. Other features, aspects, and advantages of the subject matter will become apparent from the description, the drawings, and the claims.

According to an embodiment of the present invention, a method for managing lifecycle of a product in a facility is provided. According to the method, a first data is received by a product lifecycle management system (PLMS), from an RFID reader. The first data corresponds to plurality of signals received by the RFID reader during at least one stage of the lifecycle of the product in the facility from a RFID tag coupled to the product. The plurality of signals is indicative of at least a current location of the product within the facility. Based on the current location of the product and pre-stored information relating to locations designated within the facility for each of the at least one stage of the lifecycle of the product, a current stage of the lifecycle of the product is identified by the PLMS. A second data indicative of physical conditions relating to the current stage at a designated location corresponding to the current location of the product is received by the PLMS from one or more sensors installed at the designated location. The first data and the second data are correlated by the PLMS to identify an anomaly relating to the at least one stage of the lifecycle.

According to another embodiment of the invention, a product lifecycle management system (PLMS) for managing products in a facility is provided. The system comprises a processor and a machine-readable storage medium comprising instructions executable by the processor to determine a current location of the product in the facility based on a signal received from a RFID tag associated with the product. The storage medium also comprises instructions executable by the processor to receive data indicative of physical conditions at the current location from one or more sensors installed at the current location and determine any one of the physical conditions at the current location to deviate from a corresponding predefined range of values. The instructions are further to cause a corrective action if any of the physical conditions at the current location deviates from the corresponding predefined range of values.

According to yet another embodiment of the present invention, a non-transitory computer-readable medium comprising instructions executable by a processing resource to manage lifecycle of a product in a facility is provided. The instructions, when executed, causes the processing resource to receive, during at least one stage of a process to make and deliver a product carried out in a facility, a first data corresponding to plurality of signals received from a RFID tag coupled to the product. The RFID tag of the product is associated with an unique identifier (UI) of the product. The plurality of signals is indicative of at least a current location of the product within the facility. The instructions may also cause the processing resource to identify, based on the current location of the product, a current stage of the process. The instructions further cause the processing resource to receive a second data indicative of physical conditions relating to the current stage of the process from one or more sensors installed at the current location of the product. The instructions also cause the processing resource to determine, based on correlation of the first data and the second data, an anomaly relating to the at least one stage of the process.

BRIEF DESCRIPTION OF FIGURES

The following detailed description references the drawings, wherein:

FIG. 2 illustrates a product lifecycle management (PLMS) system, in accordance with an example implementation of the present subject matter;

FIG. 6 illustrates a method for managing lifecycle of a product in a facility, in accordance with an example implementation of the present subject matter;

FIG. 7 illustrates a method for managing lifecycle of a product in a facility, in accordance with another example implementation of the present subject matter;

FIG. 8 illustrates a method for analyzing a defect in the product, in accordance with an example implementation of the present subject matter.

DETAILED DESCRIPTION

Figure 1:
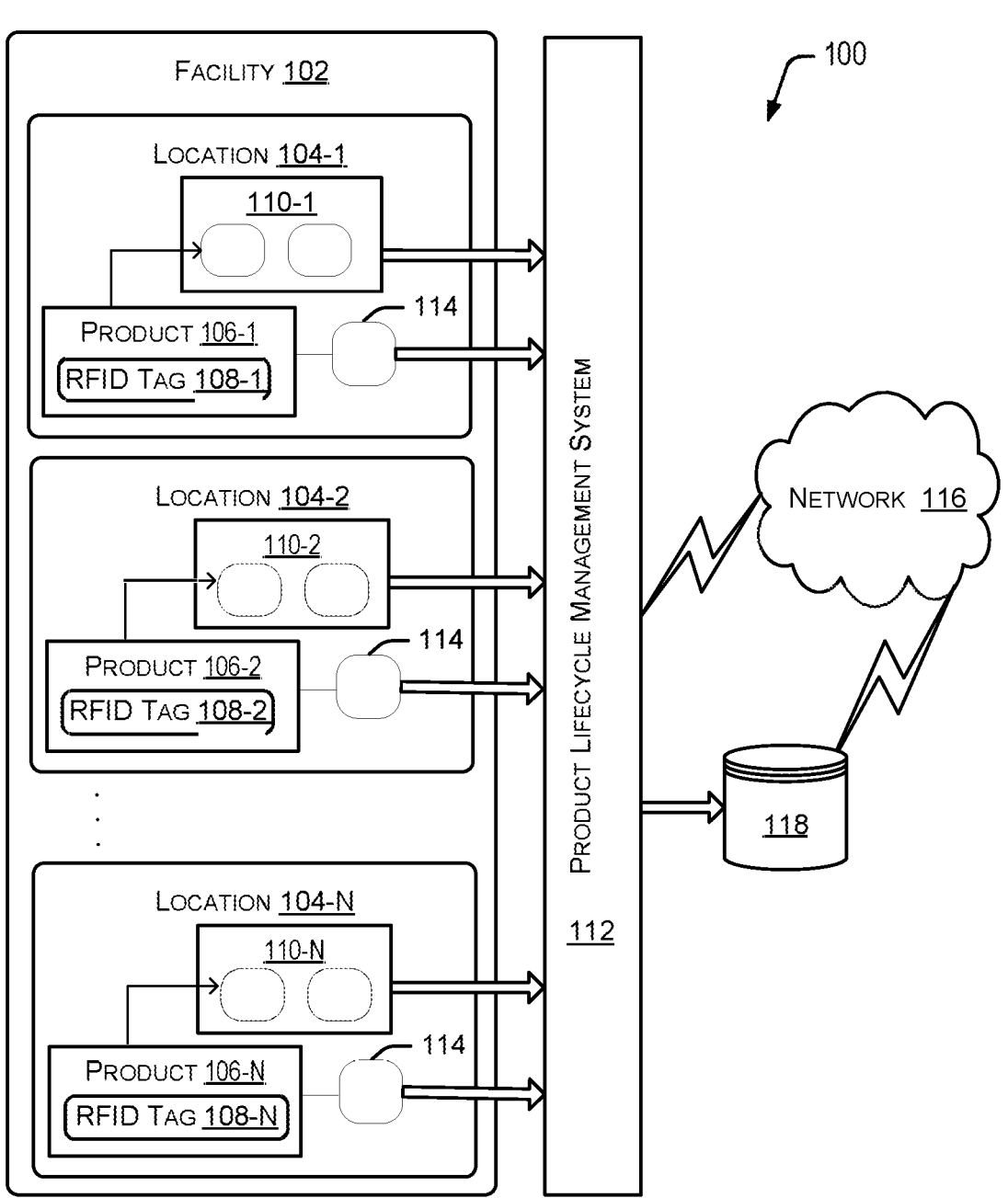
FIG. 1 illustrates a network environment for implementing example techniques for managing lifecycle of a product in a facility, in accordance with an example implementation of the present subject matter.

A process to make and deliver a product to a consumer, may involve various stages, such as a manufacturing stage, a testing stage, a packaging stage and so on. Depending on the product, the process to make and deliver the product may often be complex and may be carried out in a facility designed to cater to the various stages.

Each stage of the lifecycle of the product may be carried out at a designated location in the facility. For example, in process to make and deliver a PET scanner carried out in a facility, different parts of the PET scanner may be made at different locations, like different floors of the facility and individual parts may be assembled at another location within the facility during an assembly stage. Thereupon, the assembled PET scanner may be tested during a testing stage at another location within the facility designated to carry out the testing stage.

For quality assurance, each of the various stages of the process needs to be carried out in accordance with parameters defined in a SOP for the corresponding stage. The parameters may, for instance, be time required to carry out activities relating to a given stage or physical conditions relating to the stage. The physical conditions relating to the stage may include physical conditions for the activities to be carried out at that stage, for example, physical conditions for an activity relating to the manufacturing, testing or packaging the device; and/or physical conditions of locations where the activities of that stage are carried out, for example, physical conditions, such as ambient temperature and humidity of a location in the facility designated for the manufacturing, testing or packaging stage. For example, for a device, such as PET scanner being manufactured and tested at a facility, radioactive material enclosed inside heavy bags is put on the PET scanner to replicate a real-use scenario for testing the performance of PET scanner. Various parameters for testing the PET scanner, such as a weight of the radioactive material and the weight of the bag should be in accordance with the one defined in the SOP. Anomalies in physical conditions of testing the scanner, such as usage of bags that are excessively heavy considering the rated capacity of the PET scanner need to be identified to avoid potential failure of the device that may result owing to prolonged testing under anomalous conditions.

Additionally, incidents happening at or in the vicinity of a location where an activity of a stage is being carried out may also lead to one or more anomalies in the product. For example, an incident of fire in the location of the manufacturing stage of a device may increase the temperature of the environment beyond a temperature as defined in the SOP and may also lead to deposition of carbon particles on the product. This may degrade the quality and/or the life span of the product.

Thus, the stages of the process performed in a facility to make and deliver a product, or in other words, a lifecycle of the product in a facility, needs to be monitored and managed to identify any deviation in the parameters of the respective stage from SOP considering the impact of physical conditions of and incidents happening at the location of the stage of the product. However, existing techniques of managing a lifecycle of the product often do not track information pertaining to physical conditions relating to the stages of the lifecycle. This may lead to unexpected failure of the product and the product may have to be recalled from the location of deployment.

According to example implementations of the present subject matter, techniques for managing a lifecycle of a product in a facility are described. In embodiments, managing the lifecycle of the product in the facility involves tracking physical conditions along the various stages of the process to make and deliver the product as the different activities of the various stages of the process progress at different locations in the facility. The example methods and systems for managing lifecycle of the product in the facility prevents unexpected failure or recall of the product after deployment by identifying anomalies at different stages of the lifecycle of the product considering the physical conditions at these stages.

In example implementations, techniques for managing lifecycle of a product in a facility involves identifying anomalies during at least one stage of the lifecycle of the product. According to the technique, a first data is received by a product lifecycle management system (PLMS) from an RFID reader. The first data corresponds to plurality of signals received by the RFID reader during at least one stage of the lifecycle of the product carried out in the facility from a RFID tag coupled to the device. The plurality of signals is indicative of at least a current location of the product within the facility. Based on the current location of the product and pre-stored information relating to locations designated within the facility for each of the at least one stage of the lifecycle, a current stage of the lifecycle of the product is identified by the PLMS. Further, a second data indicative of physical conditions relating to the current stage of the lifecycle at a designated location corresponding to the current location of the product is also received by the PLMS from one or more sensors installed at the designated location. The first data and the second data are correlated by the PLMS to identify an anomaly relating to the at least one stage of the lifecycle.

In an example, the RFID tag may also be coupled with a unique identifier (UI) of the product. Anomalies identified may be recorded in a dataset of anomalies such that they are linked to the UI of the product. In response to receiving an information relating to a defect in the product, the record of the anomaly relating to the at least one stage of the lifecycle may be provided based on the dataset, for instance, to determine a root cause of the defect in the product when in use. For example, the record of the anomaly may be retrieved from the dataset, by searching the UI of the product.

Since the anomalies are identified based on considering the physical conditions at different stages of the lifecycle including the physical conditions of activities performed at respective stages and physical conditions of the location of the respective stages, an unexpected defect in the product or recall of the product when in use may be prevented. For instance, referring to the above example of testing of PET scanner, having identified a current stage to be a 'load testing' stage based on the data received from the RFID affixed to the PET scanner, weight of the bag to be used to test the PET scanner may be obtained. The weight may be obtained, in an example, from a weight sensor connected to a weighing platform designated to hold bags to be used for testing at the location within the facility designated for 'load testing'. An anomaly may be identified if an excessively heavy bag is accidently placed on the PET scanner as compared to the weight of the bag defined in accordance with the SOP.

Such anomalies may be recorded against the UI of the product for future use as well. For example, once the PET scanner is deployed in a medical facility and an issue or defect is reported in the PET scanner, the data recorded at the stages of the lifecycle may be analyzed and anomalies, if any, identified at the stages of the lifecycle may be searched to identify the root cause of the issue.

The above techniques are further described with reference to FIG. 1 to FIG. 9. It should be noted that the description and the Figures merely illustrate the principles of the present subject matter along with examples described herein and should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a network environment 100 for implementing example techniques for managing lifecycle of a product in a facility, in accordance with an example implementation of the present subject matter.

A product may be an object, tool or machine manufactured for a particular application. The application may be ranging from use by an end user to an industrial or healthcare facility. In an example, the device may include medical device, automobile, aircraft, household appliance and the like. The object may also be, for example, a consumable item such as a medicinal formulation or a food item. A lifecycle of the product in a facility 102, as may be understood, may comprise various stages of a process to make and deliver the product, such as manufacturing, testing, packaging, and distribution, with each stage involving one or more activities that are carried out in the facility.

Each stage of the lifecycle is carried out in accordance with a standard operating procedure (SOP). A process of manufacturing or the stage of manufacturing may involve converting raw material into the product through the use of human resources, machinery, tools and/or biological or chemical processing. The product is manufactured in accordance with the SOP defined for the manufacturing stage. For example, in case the product is a device, the SOP may comprise design specification of the device to be manufactured and other parameters or attributes to be followed during the manufacturing stage.

The stage of manufacturing may be followed by the stage of testing. At the stage of testing, a manufactured device may be tested to assess whether the product is performing in accordance with specified requirements. In case of a manufactured product, like a medicinal composition, the properties of the product can be tested to assess its efficacy.

Once tested, the product may be moved to a stage of packaging, wherein the product may be packed in accordance with safety standards, for example as specified in a corresponding SOP. During the stage of distribution, the packed product may be transported for distribution to a deployment location wherein the product will be used or to a distributor making the product available for use. In case the product is a device, it may be deployed at the deployment location for use. Further, the product may be used at the deployment location and may undergo maintenance, if need be, during its use.

At least one stage of manufacturing, testing or packaging of one or more products 106-1, 106-2, . . . 106-N may be carried out in the facility 102. The facility 102 may be a manufacturing plant comprising machinery to be used for manufacturing, testing or packaging of the product. Each stage of a process may be carried out at a designated location from amongst a plurality of locations 104-1, 104-2, . . . 104-N in the facility 102. For instance, the stage of manufacturing of a product 106-1 may be carried out at a first location 104-1 and the stage of testing of another product 106-2 may be carried out at a second location 104-2 at a time.

In accordance with an example of the present subject matter, a SOP corresponding to a stage, such as manufacturing, testing or packaging of the product may dictate the physical conditions of activities of that stage. For example, for a manufacturing stage of a process to make a cosmetic item, the SOP may be a series of steps to combine specified quantities of ingredients in a predefined sequence and in specific manner. In an example, the SOP corresponding to a stage may also define desired ambient physical conditions, e.g., temperature and humidity, under which the product is manufactured or tested. In other words, the SOP may dictate the ambient conditions for the various stages and in turn the corresponding locations 104-1, 104-2, . . . , 104-N in the facility 102 where the different stages are performed.

In accordance with an embodiment of the present subject matter, a product lifecycle management system PLMS 112 may be implemented to manage the lifecycle of the product. The PLMS 112 manages the stages of lifecycle of products 106-1, 106-2, . . . , 106-N carried out in the facility 102, such that each stage of a product is performed in accordance with respective SOP or the product is produced in accordance with respective SOP. In an example, the PLMS 112 may control parameters of processes carried out at each stage of the lifecycle. For example, the PLMS 112 can control speed of a mixer mixing constituents in case product is a medicinal formulation or raw materials in case the product is a device.

The PLMS 112 may be any computing device, such as a server, a desktop computer, laptop, smartphones, or a tablet. The PLMS 112 may comprise one or more processors for executing instructions to manage the stages of lifecycle of products. In an example, the processor may be implemented as microprocessors, microcomputers, microcontrollers, digital signal processors, central processing units, state machines, logic circuitries, and/or any devices that manipulate signals based on operational instructions. The PLMS 112 may comprise a memory for storing the instructions executable by the one or more processor. The instructions may cause the processor to manage at least one stage of the lifecycle of the products. The memory may include any computer-readable medium known in the art including, for example, volatile memory (e.g., RAM), and/or non-volatile memory (e.g., EPROM, flash memory, etc.). The memory may also be an external memory unit, such as a flash drive, a compact disk drive, an external hard disk drive, or the like.

In accordance with examples of the present subject matter, to manage at least one stage of the lifecycle of the products 106-1, 106-2, . . . 106-N, a Radio Frequency Identification (RFID) tag 108-1, 108-2, . . . 108-N may be coupled to each product 106-1, 106-2, . . . , 106-N to provide information relating to the stage of the lifecycle, the product is currently at or the activity it is undergoing, to the PLMS 112. In an example, the association of the RFID tag to a product may be dependent on the nature of the product and a process of associating tag and product may involve removing and reaffixing RFID tag at various stages of the process to make and deliver the product. For instance, for a medicine, at a stage where ingredients are mixed, the RFID tag can be on a container containing the ingredients being mixed at mixing stage. When product moves to the next stage, e.g., drying stage, the RFID tag can be affixed to a tray holding the product for drying. For a PET scanner, the RFID tag can be affixed to a part of a chassis to which other parts of the PET scanner are assembled.

One or more RFID readers 114 may be installed within the facility depending on a frequency range or a read range of the RFID tag 108-1, 108-2, . . . , 108-N or a detection range of RFID reader 114. In an example, a RFID reader 114 may be installed at various locations 104-1, 104-2, . . . , 104-N within the facility 102 for RFID tag 108-1, 108-2, . . . , 108-N having short read range or a single RFID reader 114 may be installed within the facility 102 to communicate with the RFID tags 108-1, 108-2, . . . , 108-N having long read range coupled with products 106-1, 106-2, . . . , 106-N at each location 104-1, 104-2, . . . , 104-N within the facility 102. The RFID tag 108-1, 108-2, . . . , 108-N may provide the information to the PLMS 112 via the RFID reader 114, when the RFID tag 108-1, 108-2, . . . , 108-N comes in the detection range of the compatible RFID reader 114. For instance, the RFID tag 108-1, 108-2, . . . , 108-N may provide the location 104-1, 104-2, . . . , 104-N of the product 106-1, 106-2, . . . , 106-N to the PLMS 112. In an example, to provide location of the product to the PLMS 112, RFID tag 108-1, 108-2, . . . , 108-N with embedded GPS receivers can be coupled to each product 106-1, 106-2, . . . , 106-N. The RFID tag 108-1, 108-2, . . . , 108-N may provide GPS location coordinates to the PLMS 112 through the RFID reader 114.

In an example, when the product is moved from one location to another location within the facility 102 as it progresses through the stages, the RFID tag 108-1, 108-2, . . . , 108-N may provide the PLMS 112, an updated location of the product 106-1, 106-2, . . . , 106-N to the PLMS 112 along with a timestamp. Based on this signaling of a change in location of the product, the time spent by the product 106-1, 106-2, . . . , 106-N at a location 104-1, 104-2, . . . , 104-N within the facility 102 may be calculated by the PLMS 112, from the timestamps associated with two subsequent signals corresponding to changes in location of the product 106-1, 106-2, . . . , 106-N. The calculated time may correspond to a time spent at a stage of the lifecycle of the product carried out at the respective location 104-1, 104-2, . . . , 104-N, or, in other words, the time taken for the activities of the corresponding stage to be carried out on the product. In examples, the calculated time may indicate, information such as the time taken to assemble the product, the time taken to test the product, or the time taken to pack the product.

According to an embodiment of the present subject matter, one or more sensors 110-1, 110-2, . . . 110-N may also be installed at the various locations 104-1, 104-2, . . . , 104-N of the facility to sense physical conditions of the stage. The physical conditions of the stage includes physical conditions of the respective location and operating parameters of the at least one stage of the lifecycle of the product such as manufacturing or testing or packaging being performed at the respective location.

In an example, the physical conditions of the location may include ambient temperature and humidity. For instance, in a location, such as a chemical lab wherein a medicinal composition is being produced, physical conditions may include measure of gases, fumes, radiation and the like. The physical condition may be sensed by a corresponding sensor 110-1, 110-2, . . . , 110-N and communicated to the PLMS 112. The sensors 110-1, 110-2, . . . , 110-N may communicate with the PLMS 112 using a wired connection or a wireless technique. In an example, the sensors may be linked to the PLMS 112 through a IoT system installed in the facility.

In an example, the physical conditions of the location 104-1, 104-2, . . . , 104-N may also include information indicative of incidents that may occur at the various locations 104-1, 104-2, . . . , 104-N. For example, a fire accident, that may occur at a location may affect the quality of a product at or in proximity to the location. The fire accident may be sensed by a fire sensor installed at the location and communicated to the PLMS 112.

Examples of operating parameters of the stage may include sequence and time to carry out the activities of the stage, such as mixing, drying, quenching; parameters associated with various components or equipments used to carry out the activities, such as speed of a mixer for mixing, temperature for quenching; and attributes of the product or its constituents, such as weight or viscosity of the product or constituents. Accordingly, one or more sensors 110-1, 110-2, . . . , 110-N may be connected with the respective equipments and the product 106-1, 106-2, . . . , 106-N to be produced to sense the variable parameters associated with the corresponding equipments. Also, in some situations, one of more physical conditions may be provided to the PLMS 112 as manual inputs. For instance, reporting the incident of fire in the proximity of the product during a stage of the lifecycle may be input to the PLMS 112 by an operator.

In an example, sensors 110-1, 110-2, . . . , 110-N may communicate the information to PLMS 112 either directly or via the RFID tag 108-1, 108-2, . . . , 108-N and the RFID reader 114.

Based on data received from the RFID reader 114 and the one or more sensors, the PLMS 112 may identify an anomaly relating to a stage of the lifecycle. The anomaly relating to a stage may, for instance, be identified based on a deviation in at least one physical condition of the stage from the corresponding SOP. For example, if the time utilized to carry out a stage is less than or greater than the time required to carry out the stage according to SOP, then an anomaly may be introduced in the product 106-1, 106-2, . . . , 106-N at the respective stage and may further be propagated to subsequent stages in the lifecycle of the product. For example, as mentioned above, occurrence of a fire incident in the location of manufacturing of a device may lead to deposition of carbon particle on the device which may lead to an anomaly in the device which may be propagated to subsequent stages of the lifecycle such as testing or packaging.

The anomaly identified may also be recorded by the PLMS 112 in a dataset 118. The dataset 118 may be stored in the memory of the PLMS 112 in an implementation or may be stored in a memory of any other device, such as an external database server. Implementations where anomalies recorded by the PLMS 112 may be stored by devices other than the PLMS 112 are also possible.

In an embodiment, upon detection of an anomaly, depending on the product and the severity of the anomaly, corrective actions may be initiated. Examples of corrective actions include discarding the product, carrying out a process of maintenance or optimization or decreasing the expected time of failure or expiration time of the product. Such corrective actions may be implemented on identification of an anomaly.

In an example, the RFID tag 108-1, 108-2, . . . , 108-N is also associated with a unique identifier (UI) of the product 106-1, 106-2, . . . , 106-N. Depending on granularity of the product, the UI may be associated with the RFID tag of the product or a collection of the products. For example, if the product is a medical formulation, the medical formulation in the form of multiple tablets, may be packaged as a pallet of tablets. In such cases, the UI may be assigned to a pallet. If the product is a device, a UI may be assigned to an individual device. The UI may be a series of numeric or alphanumeric characters that may be created through a product identification and coding standard applicable in the field of product and allows the unambiguous identification of a specific product on the market. For example, in case of a medical devices, Food and Drug Administration (FDA) provides guidelines for a unique device identification system. The UI may include the manufacturer, type or version of the product, batch number of manufacturing, serial number, expiration date, date of manufacturing and the like. The anomalies may be recorded in the dataset against the UI of the product 106-1, 106-2, . . . , 106-N, for instance, to determine a root cause of a defect in the product 106-1, 106-2, . . . , 106-N when in use. The dataset 118 may be searched through the UI for identifying a record of an anomaly relating to stage of the product.

The dataset 118 and/or the PLMS 112 may be connected over a network 116 for the purpose of exchange of the data. In an example, the network 116 may be a single network or a combination of multiple networks and may use a variety of different communication protocols. The network may be a wireless or a wired network, or a combination thereof. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN). Depending on the technology, the network 116 includes various network entities, such as, gateways, routers; however, such details have been omitted for sake of brevity of the present description.

The dataset 118 may be available, in an example implementation, over the network 116, as a repository of data received from RFID tags and data received from the sensors that is indicative of physical conditions during the time the product progressed through the various stages in the facility. The data stored in the dataset can be used for root cause analysis if a defect occurs in the product when in use. Further, data indicative of physical conditions collected over time can provide insights as to what anomalies lead to which defect and can reveal physical conditions to be prevented in future. For example, based on the data of indicative physical conditions collected over time, it may be determined that exposure of a consumable product to a certain level of humidity for over, say, 20 mins may lead to a defect, such as high moisture content in the product. Accordingly, measures may be taken to limit the exposure to up to 15 mins.

FIG. 2 shows the PLMS 112, according to an example implementation of the present subject matter. The PLMS may be one or more computing devices, such as desktop computers, laptops, smartphones, personal digital assistants (PDAs), tablets and servers.

In an example, the PLMS 112 comprises a processor 202. In an example, the processor 202 may be implemented as microprocessors, microcomputers, microcontrollers, digital signal processors, central processing units, state machines, logic circuitries, and/or any devices that manipulate signals based on operational instructions.

As explained previously, one or more stages of a process to make and deliver a product, such as manufacturing, testing or packaging are generally carried out in the facility 102. One or more activities involved in a stage of the process may be carried out at a designated location within the facility, for example, locations 104-1, 104-2, . . . , 104-N. According to an example implementation, the PLMS 112 manages the lifecycle of the product within the facility such that each stage of the process is in accordance with corresponding standard operating procedure (SOP).

As described with reference to FIG. 1, one or more RFID readers 114 are installed within the facility 102 to receive signals from the RFID tag, such as 108-1 associated with the product 106-1. In another example, the PLMS 112 may comprise a RFID reader 114 or capability read RFID tag. During at least one stage of the process, the RFID tag 108-1 coupled to the product 106-1 may transmit plurality of signals to the RFID reader 114. The plurality of signals may contain information relating to the stage. The processor 202 of the PLMS 112 determines a current location 104-1, 104-2, . . . , 104-N of the product within the facility 102 based on a signal received from the RFID tag 108-1 coupled to the product 106-1.

Further, as explained above, one or more sensors 110-1, 110-2, . . . , 110-N are installed at each location 104-1, 104-2, . . . , 104-N of the facility 102 to sense physical conditions at the respective location. The physical conditions at a location 104-1, 104-2, . . . , 104-N may include operating parameters for one or more activities carried out at the location and ambient physical conditions of the location such as ambient temperature, humidity or air pressure. Physical conditions at the location may also include other incidents, such as a fire accident, occurring in the proximity of the product 106-1 and that may affect the activities carried out at the location 104-1, 104-2, . . . , 104-N and quality of the product. Operating parameters may include operating parameters of various components and equipments to be used during the activities and attributes of the product such as weight of the product. In an example, if the product is a medical formulation, the operating parameter may be a blending time required to blend two or more substances. If the product is a device, the operating parameter may be a feed rate of a piece of material in a cutting tool. The processor 202 receives a data indicative of the physical conditions at the current location from the one or more sensors 110-1 installed at the current location of the product.

To manage the product 106-1, the processor 202 of the PLMS 112 determines any one of the physical conditions to deviate from a corresponding predefined range of values that may be defined in the SOP. The deviation may introduce an anomaly in the product. For instance, in case of a medical formulation, a compression force or pressure to be applied during activity of a tablet compression may be defined as ranging from 10-35 Kn and an exerted compression force during the activity exceeds 35 Kn. This deviation may introduce an anomaly in the final product which is a tablet.

If any of the physical conditions at the current location deviate from the corresponding predefined range of values, the processor 202 of the PLMS 112 causes a corrective action to be implemented. The corrective action may, for instance, be stopping the corresponding activity, generating an alert, discarding the product 106-1. In the above example of medical formulation, the corresponding activity may be stopped or the product may be discarded. Alternatively, the corrective action may also be repeating the activity.

Figure 3:
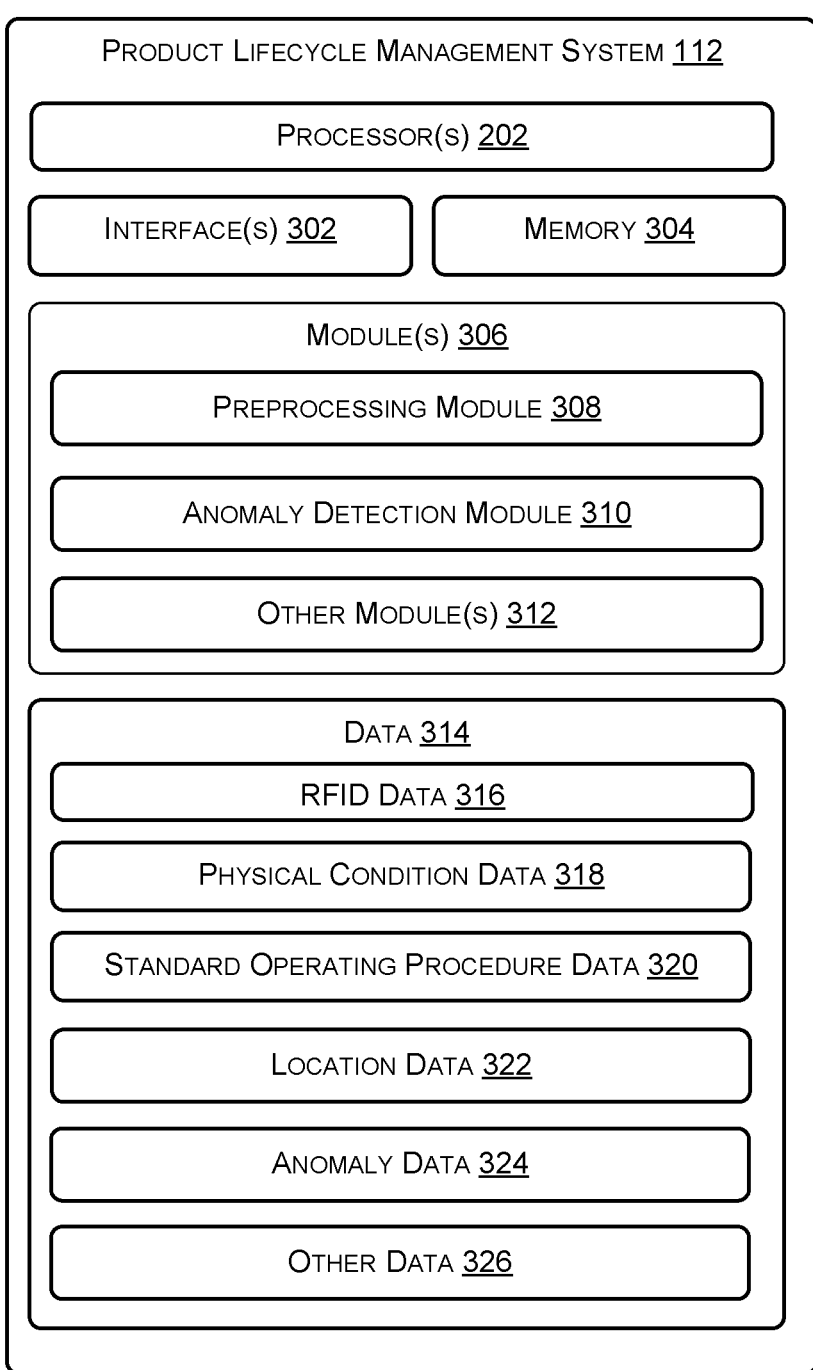
FIG. 3 illustrates the product lifecycle management (PLMS) system, in accordance with another example implementation of the present subject matter.

FIG. 3 illustrates the PLMS 112 according to another example implementation of the present subject matter. In an example, the PLMS 112 may be any computing device, such as servers, desktop computers, laptops, smartphones, personal digital assistants (PDAs), and tablets.

Figure 4:
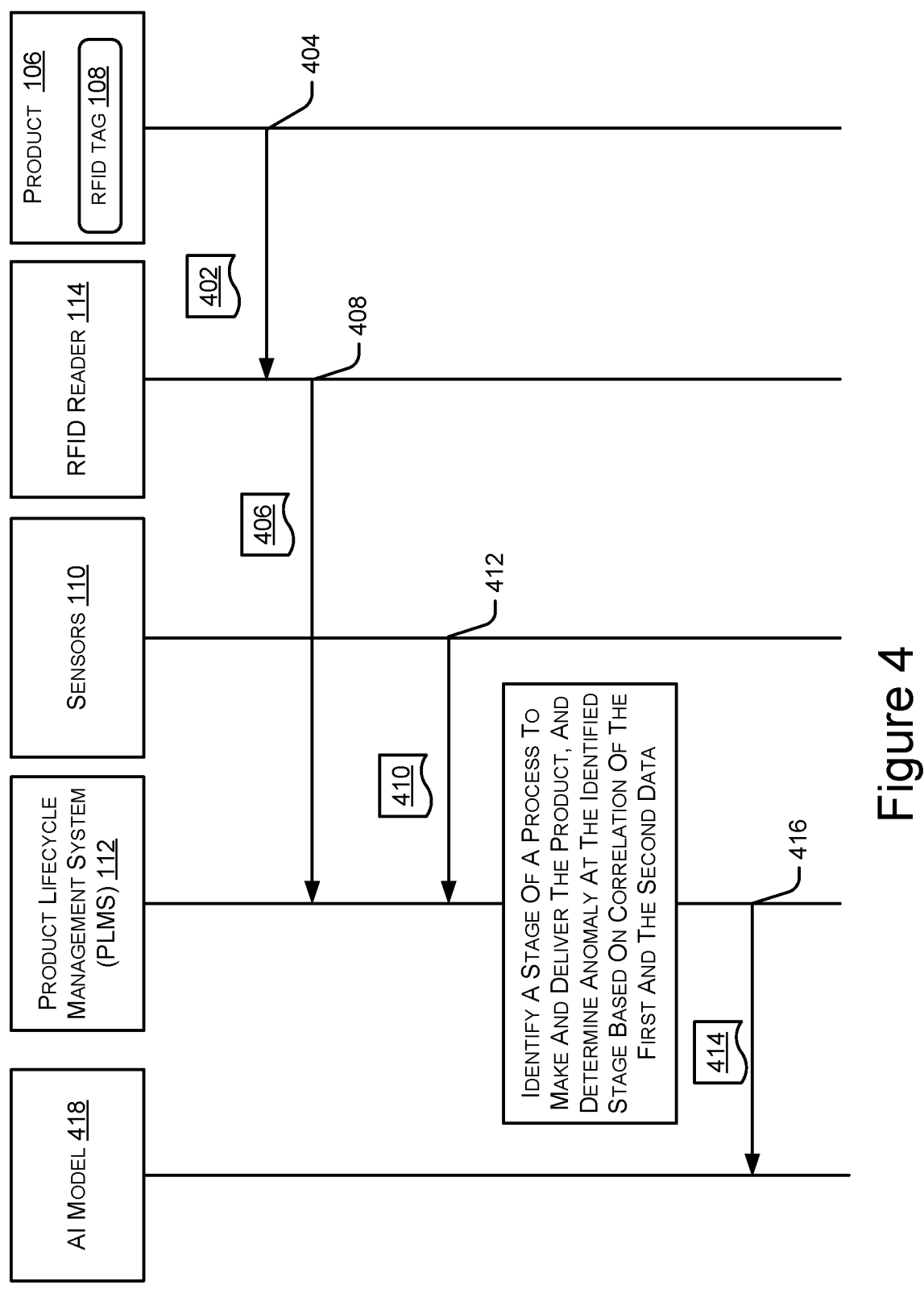
FIG. 4 illustrates a signal flow in a process to manage lifecycle of the product in the facility, in accordance with an example implementation of the present subject matter.

As explained previously, the PLMS 112 is configured to manage lifecycle of a product in a facility such as the facility 102. FIG. 4 illustrates a signal flow that takes place in order to manage lifecycle of the product in the facility. A product, such as an object or device may be manufactured for a particular application and delivered to an end user or a place of use through a process to make and deliver the product. The object may be a device, such as an equipment, a medical device etc., or a consumable item, such as a medical formulation, food item or other chemical formulations, for example.

The process to make and deliver the product is carried out in the facility 102 such as a manufacturing plant. The facility 102 may comprise equipments and other resources used to carry out the process. The process may comprise various stages such as manufacturing, testing or packaging constituting a lifecycle of the product in the facility 102. The facility may have one or more locations, such as the locations 104-1, 104-2, . . . , 104-N of the facility 102, each designated to carry out a stage of the process, an example of which has been discussed in reference to FIG. 1.

The products 106-1, 106-2, . . . , 106-N may go through different stages of the process at respective designated location. Each stage of the process may involve one or more activities performed at the designated location 104-1, 104-2, . . . , 104-N within the facility 102. The PLMS 112 manages the stages of the process carried out in the facility 102 or lifecycle of the product in the facility 102 by monitoring and controlling activities at various stages of the process carried out in the facility 102, in an example.

In an example implementation, the PLMS 112 comprises the processor 202. In an example, the processor 202 may be implemented as microprocessors, microcomputers, microcontrollers, digital signal processors, central processing units, state machines, logic circuitries, and/or any devices that manipulate signals based on operational instructions. The PLMS 112 also comprises interface(s) 302 coupled to the processor 202. The interface(s) 302 may include a variety of software and hardware interfaces that allow interaction of the PLMS 112 with other communication and computing devices, such as network entities, web servers, and external repositories, and peripheral devices. For example, the interface(s) may couple the PLMS 112 with the dataset 118. The interface(s) 302 may also enable coupling of internal components of the PLMS 112 with each other.

Further, the PLMS 112 comprises a memory 304 coupled to the processor 202. The memory 304 may include any computer-readable medium known in the art including, for example, volatile memory (e.g., RAM), and/or non-volatile memory (e.g., EPROM, flash memory, etc.). The memory may also be an external memory unit, such as a flash drive, a compact disk drive, an external hard disk drive, or the like. The PLMS 112 may comprise module(s) 306 and data 314 coupled to the processor 202. In one example, the module(s) 306 and data 314 may reside in the memory 304.

In an example, the data 314 may comprise a RFID data 316, physical condition data 318, standard operating procedure (SOP) data 320, location data 322, anomaly data 324 and other data 326. The module(s) 306 may include routines, programs, objects, components, data structures, and the like, which perform particular tasks or implement particular abstract data types. The module(s) 306 further includes modules that supplement applications on the PLMS 112, for example, modules of an operating system. The data 314 serves, amongst other things, as a repository for storing data that may be fetched, processed, received, or generated by one or more of the module(s) 306. The module(s) 306 may include a communication module 308, anomaly detection module 310 and other module(s) 312. The other module(s) 312 may include programs or coded instructions that supplement applications and functions, for example, programs in the operating system of the PLMS 112.

As explained with reference to FIG. 1, a RFID tag is coupled to each product as it progresses through the respective stages of the process in the facility 102. During a stage of the process to make and deliver the product, such as product 106-1, 106-2, . . . , 106-N (hereinafter referred to as 106), the RFID tag 108-1, 108-2, . . . , 108-N (hereinafter referred to as 108) coupled to the product 106 may transmit plurality of signals to a RFID reader 114 from a RFID reader 114 installed at the facility 102, for example, when the RFID tag 108 comes in detection range of the RFID reader 114. The plurality of signals may contain information relating to the stage. The information may comprise at least a current location of the product 106 within the facility 102.

To provide location 104-1, 104-2, . . . , 104-N of the product 106, within the facility 102, the RFID tag may be an active RFID tag containing a GPS transceiver along with battery. In an example, an event of change of location of the product 106 may also be signaled by the RFID tag 108 by transmitting an updated location along with a timestamp to the RFID reader 114.

In an example, the communication module 308 of the PLMS 112 receives a first data corresponding to the plurality of signals from the RFID reader 114. The first data may be stored in the RFID data 316. Each stage is carried out at a location designated for the stage and information relating to locations 104-1, 104-2, . . . , 104-N designated within the facility 102 for the respective stages may be prestored in the location data 322. Based on the current location of the product 106 and the prestored information relating to locations 104-1, 104-2, . . . , 104-N designated within the facility 102, the communication module 308 may identify the current stage of the process with respect to the product 106 in the facility 102. For example, if current location is identified as location 104-2 and the location 104-2 is designated to carry out the stage of testing of the process to make and deliver the product 106, the communication module 308 can identify that the product 106 is currently at the stage of testing.

Further, each stage of the process is carried out in accordance with SOP. The SOP may be stored in the SOP data 320. As described above, SOP may define conditions or parameters to be followed during the activities carried out at various stages of the process. SOP may also define ambient physical conditions for the various locations designated to carry out activities at various stages of the process. Ambient physical conditions may include ambient temperature, humidity or air pressure. For example, if the product 106 is a food item, SOP may define that, for example, ambient humidity at the location of packaging stage exceeding a predefined threshold may affect a texture of the food item.

The data pertaining to the SOP may be stored in the key parameter data of the data of the PLMS.

During various stages of the process carried out in the facility 102, any deviation from the SOP may introduce an anomaly in the product 106. For instance, in the above example of food item, ambient humidity at the location of packaging stage of the process exceeding the predefined threshold as specified in SOP may cause the food item to have an unpleasant texture.

To ensure that each stage is carried out in accordance with SOP, one or more sensors 110-1, 110-2, . . . , 110-N (hereinafter referred to as 110) are installed at each location of the facility 102. The one or more sensors 110 sense the physical conditions corresponding to the respective stage. The physical condition corresponding to a stage may include conditions or operating parameters for one or more activities carried out at the stage. The operating parameters for the activities may include operating parameters of equipments involved in carrying out the activities at the stage and other parameters required to carry out an activity. The examples of the operating parameters of one or more equipements may include rotation per minute (RPM) of a blending machine during the activity of blending of two or more substances or pressure and flow rate of steam, temperature of a steam boiler producing steam. Examples of other parameters for the activities may include time required to keep a mixture of two or more materials at room temperature after heating at a high temperature.

In an example, the physical condition may also include ambient physical conditions at the respective locations of the various stages of the process. The physical conditions also include incidents occurring in proximity of the product 106, such as fire incidence affecting the activities carried out at the stage and quality of the product 106 being manufactured. Examples of physical conditions may also include attributes of the product 106, such as the weight of the product 106.

A physical condition may have a predefined range of values specified by the SOP. The physical condition may be sensed by a corresponding sensor 110 installed at the respective location. For example, a humidity sensor may measure ambient humidity. The sensors 110 may also sense the operating parameters of one or more equipments involved in carrying out the activities at the said stage. For example, in case of a medical formulation, RPM sensor may determine speed of rotation of a blending machine during the activity of blending two or more substances.

In one embodiment, the communication module 308 of the PLMS 112 receives a second data indicative of physical conditions relating to the current stage at the designated location corresponding to the current location of the product 106 from the one or more sensors 110 installed at the designated location. The second data may be stored in the physical condition data 318 of the PLMS 112.

In an example implementation, the RFID tag 108 is an active tag comprising battery. The active RFID tag 108 may be configured to communicate with the sensors 110 for receiving data sensed by the sensors 110. The RFID reader 114 may receive the data sensed by the sensors 110 from RFID tag 108 and RFID reader 114 may in turn transmit the data to the PLMS 112. The communication module 308 of the PLMS 112 may receive the data. In an example, the RFID tag may obtain ambient temperature data from a temperature sensor, ambient humidity data from a humidity sensor. In another example, RFID tag may receive data from pressure sensor coupled to an equipment to monitor pressure conditions during an activity at the stage of manufacturing such as a tablet compression. In another example, flow sensors coupled to a fluid processing equipment can transmit data to RFID tags to monitor flow rates of liquids and gases during production of products such as medical formulations.

In an embodiment, to manage the lifecycle of the product 106, the anomaly detection module 310 of the PLMS 112 may determine an anomaly relating to the at least one stage of the lifecycle based on correlation of the first data 406 and the second data 410. In an example, the physical conditions relating to the stage as sensed by the sensors 110 installed at the designated location may be correlated with the current stage as identified based on the first data 406. The anomaly detection module 310 may identify a physical condition relating to the current stage to deviate from a corresponding predefined range of values that may be defined in the SOP for the current stage. The identified deviation may be considered as an anomaly relating to the current stage.

For instance, consider a PET scanner is produced for scanning small animals weighing less than 35 kg. During a stage of testing the PET scanner, an excessively heavy bag of more than 70 kg may accidentally be placed on the bed of the PET scanner erroneously considering that the PET scanner is for scanning humans and rated capacity of the scanner is 100 kg. This anomaly of testing using a weight exceeding the rated capacity of the scanner may introduce a defect in the scanner and may degrade the life of scanner. In an example, a weight sensor that may be attached to the bed of the PET scanner or to a weighing platform designated to hold the bag during the stage of testing of PET scanner may measure the weight of the bag. An anomaly may be identified if the PLMS 112 determines that the weight of the bag measured by the weight sensor exceeds the weight defined in the SOP.

In another example, a physical condition may indicate occurrence of a fire incidence at or in the proximity of the location. The fire incidence may be reported by a fire sensor or a camera installed at the location or in the proximity of the location. The fire incidence may increase the temperature of the location or carbon particles in the ambient air. On receiving a report of the fire incidence, the current stage of the process ongoing at the location or in the vicinity of location of the fire incidence may be identified and ambient temperature of the designated location of the stage may be compared with the corresponding predefined range of values to identify a deviation. If deviation greater than a threshold is identified, an anomality may be said to occur.

In another example, in the event of change of location of the product 106, the updated location of the product 106 along with timestamp as received from the RFID reader 114 may be used to determine a time duration of the product being located at the current location or the time spent at a stage of the process. The time spent at the current stage may be determined based on a difference between the timestamps received along with two consecutive signals corresponding to updated location received by the communication module from RFID reader 114. Any deviation in time spent at the stage from the one defined in the SOP may be considered as an anomaly relating to the stage. A missing stage may also be identified based on the updated location of the product 106. In an example scenario, if at time instance t1, a location of the product is location 104-1 designated to carry out a stage of manufacturing, and subsequently, at time instance t2, the next location of the product is location 104-3 (not shown in Figure) designated to carry out packaging, a stage of testing that ought to be carried out at location 104-2, after the stage of manufacturing can be determined to have been missed. Thus, the stage of testing may be identified as a missing stage. The anomaly detection module 310 may identify such anomaly.

In a similar manner, the anomaly detection module 310 may also identify if the product spends inadequate time at a stage, for example, indicating that the activities of that stage may have been performed in haste. In another example, the anomaly detection module 310 may identify a time duration for which the product 106 was exposed to a deviated condition at a location. For example, referring to the foregoing scenario of testing of the PET scanner with overweight bags, the anomaly detection module 310 may determine how long the scanner was exposed to the anomalous test condition or, in other words, how much time was the scanner bed bearing the excessive weight. For instance, for a medical formulation exposed to a high temperature or high humidity, the anomaly detection module 310 may identify how long the product was exposed to the deviated condition, e.g., for 30 mins or 6 hrs., based on the determined time spent at the location. Determination and recording, for example in the dataset 118, the time of exposure to anomalous conditions, may provide for checking compliance with a corresponding SOP.

Accordingly, in an embodiment, to manage the lifecycle of the product 106, the anomaly detection module 310 of the PLMS 112 may inspect the first data and the second data corresponding to a stage as recorded to check compliance with SOP at a later stage.

In an example, based on identification of an anomaly relating to a stage, the anomaly detection module 310 may cause a corrective action. The corrective actions may be implemented to minimize the effect of anomaly. Examples of corrective action may include stopping or repeating the corresponding activity, generating an alert, discarding the product 106, optimize an expected expiration time or time of failure of the product 106.

In an example, the RFID tag 108 of each product 106 is associated with a unique identifier (UI) for unique identification of the product 106. As would be understood, each RFID tag has an unique identification number or label. In an example, the unique identifier of the RFID tag may be assigned as the UI of the product. In another example, the unique identification number of the RFID tag may be associated with the UI of the product which may be assigned to a final delivered product. UI may be assigned to an individual product, such as a device or a collection of products, such as a pallet of tablets. The UI may be defined based on guidelines specified by a regulatory authority in the field of the product. For example, in case of medical devices, a statutory body, such as the Food and Drug Administration (FDA) may provide guidelines for a unique device identification system. As mentioned above, the UI may include details of the manufacturer, type or version of the product, batch number of manufacturing, expiration date, date of manufacturing and the like. The anomalies relating to each stage as identified may be recorded in a dataset which may be stored in the anomaly data 324 of the PLMS 112 against the UI of the product. The anomalies may also be stored in dataset 118.

In an example, the first data as received from the RFID tag and the second data as received from the sensors corresponding to a stage may be recorded in the dataset 118 against the UI of the product 106. In an example, the first data and the second data recorded in the dataset 118 may be analyzed at a later instance, for example, after deployment of the product 106 or during its use, when a defect is detected in the product 106 and reported to the PLMS 112. If an anomaly is identified at a later instance, it may also be recorded in the dataset 118.

In an example, the dataset 118 may be provided to an artificial intelligence (AI) model as training data. The AI model may be trained using the dataset 118 containing the anomalies identified at various stages of the process in order to optimize a process to make and deliver a product 106 by avoiding anomalous conditions in future instances.

In an example, the AI model may be installed in a training system (not shown in figures). The training system may be a computing device, such as a server. In an example, the AI model may be implemented using machine learning algorithms that learn to optimize the process to make and deliver the product 106. The AI model may include routines, programs, objects, components, data structures, and the like, which perform prediction or implement particular abstract data types. In an example implementation, the AI model may be incorporated in the PLMS 112 itself.

In an example embodiment, in case of a product, upon having gone through the corresponding stages, the RFID associated with the UI of the product may provide information relating to product identification; information relating to manufacturing, quality control, storage and handling, supply chain and logistics; information relating to regulatory compliance, authentication and anti-counterfeiting; information relating to environmental monitoring, maintenance and equipment data, waste management, inventory management, product recalls and documentation and certificates. The product identification information may include product name, e.g., name of a medical formulation or medical device. Manufacturing information may include batch number, manufacturing date, expiry date, information relating to the facility where the product was made, details about the specific manufacturing processes and equipment used. Quality control data may include information about tests conducted during the process to make and deliver the product, including test results for purity, potency, and safety, e.g., for a medical formulation. Information relating to storage and handling instructions may include recommended storage temperature and humidity conditions for the product and guidance on how the product should be handled and transported. Information relating to supply chain and logistics may include information about when the product was shipped from the manufacturing facility, when it was received at distribution centers, real-time tracking of shipment of the product to distribution center or deployment location to monitor their location and status and data related to distributors, wholesalers, and retail locations where the product is delivered. Real time tracking may be done through a GPS receiver which may be embedded in RFID tag. Information relating to regulatory compliance may include information about regulatory approvals and certifications for the product and documentation related to regulatory compliance and adherence to industry standards. Information relating to authentication and anti-counterfeiting may include authentication codes and cryptographic keys to verify the authenticity of the product and Indicators of whether the product's packaging has been tampered with. In case of a pharmaceutical product such a medical formulation or a medical device, the patient information may include patient-specific information such as patient identifiers, prescription details, and dosage instructions (typically for prescription medications) or the expiration date of a prescription. Information relating to environment monitoring may include information obtained through continuous monitoring of environmental conditions such as temperature and humidity during storage and transportation to ensure product integrity. Information relating to tracking of manufacturing equipment and machinery usage for the purpose of maintenance and calibration of the product. Information relating to waste management may include information on proper disposal methods for unused or expired products. Information relating to inventory management may include real-time tracking of inventory levels to manage stock and reordering of product. Information relating to product recall may include information relating to product recalls in case of a failure of the product during use, including affected batch numbers and reasons for recall. Information relating to documentation and certificates may include digital certificates and signatures for authenticity and traceability of the product. Such information may either be encoded in RFID tag or the RFID may be configured to obtain the information from a sensor. For instance, environmental conditions such as temperature and humidity during storage and transportation may be obtained through a corresponding sensor by the RFID tag. Such information may also be recorded in the dataset to manage and maintain the product during use.

FIG. 4 illustrates a signal flow in a process to manage lifecycle of the product in a facility. As described with reference to FIG. 3, to manage the lifecycle of the product 106 in the facility 102, plurality of signals 402 may be received by the RFID reader 114 from the RFID tag 108 coupled to the product 106 as indicated through a signal 404. The plurality of signals may be indicative of a current location of the product within the facility 102. In an example, the plurality of signals may also be indicative of characteristics of the product, such as a product identifier of the product, a model no. or batch no. of the product. The PLMS receives the first data 406 corresponding to plurality of signals from the RFID reader 114 as indicated through a signal 408. In an example, the communication module of the PLMS may receive the first data 406 from the RFID reader 114.

Based on the current location of the product 106 and pre-stored information relating to locations 104-1, 104-2, . . . , 104-N designated within the facility for the various stages of the lifecycle of the product 106, a current stage of the lifecycle of the product 106 may be determined. In an example, the information relating to locations may be prestored in the location data 322 of the data 314 of the PLMS 112.

The PLMS 112 may further receive the second data 410 from the sensors 110 installed at a designated location corresponding to the current location of the product. Signal 412 indicates the transmission of second data between the sensors 110 and the PLMS 112. The second data 410 may be indicative of physical conditions relating to the current stage at the designated location. As explained previously, the physical conditions relating to the current stage may include ambient conditions, such as temperature, humidity, and fumes at the designated location corresponding to the current stage. The physical conditions relating to the current stage may also include conditions for performing activities of the current stage. The conditions for performing the activities may include the operating parameters of one or more equipements involved in carrying out the activities of the current stage or other parameters of the activities, such as sequence of activities to be performed at a stage, time required to perform each activity.

The anomaly detection module 310 of the PLMS 112 may correlate the first data 406 and the second data 410 to identify one or more anomalies relating to at least one stage of the lifecycle. The correlating of the first data and the second data may comprise identifying one or more of the physical conditions relating to the current stage to deviate from corresponding predefined range of values as specified in the SOP data 320 of the PLMS 112. The anomalies identified may be recorded in the dataset 118 or in the anomaly data 324 of the PLMS 112. In an example, the first data and the second data relating to the current stage may also be recorded in the dataset 118 to identify anomalies at future instances, for example, in the event of occurrence of a defect in the product or at a stage of the lifecycle.

In an example, the anomaly detection module 310 may provide data 414 contained in the dataset to the AI model 418 as indicated through a signal 416. The AI model 418 may be trained using the dataset 118 in order to optimize the process to make and deliver the product. The AI model may identify one more anomalies based on analyzing the first data and the second data or the recorded anomalies in the dataset 118.

Figure 5:
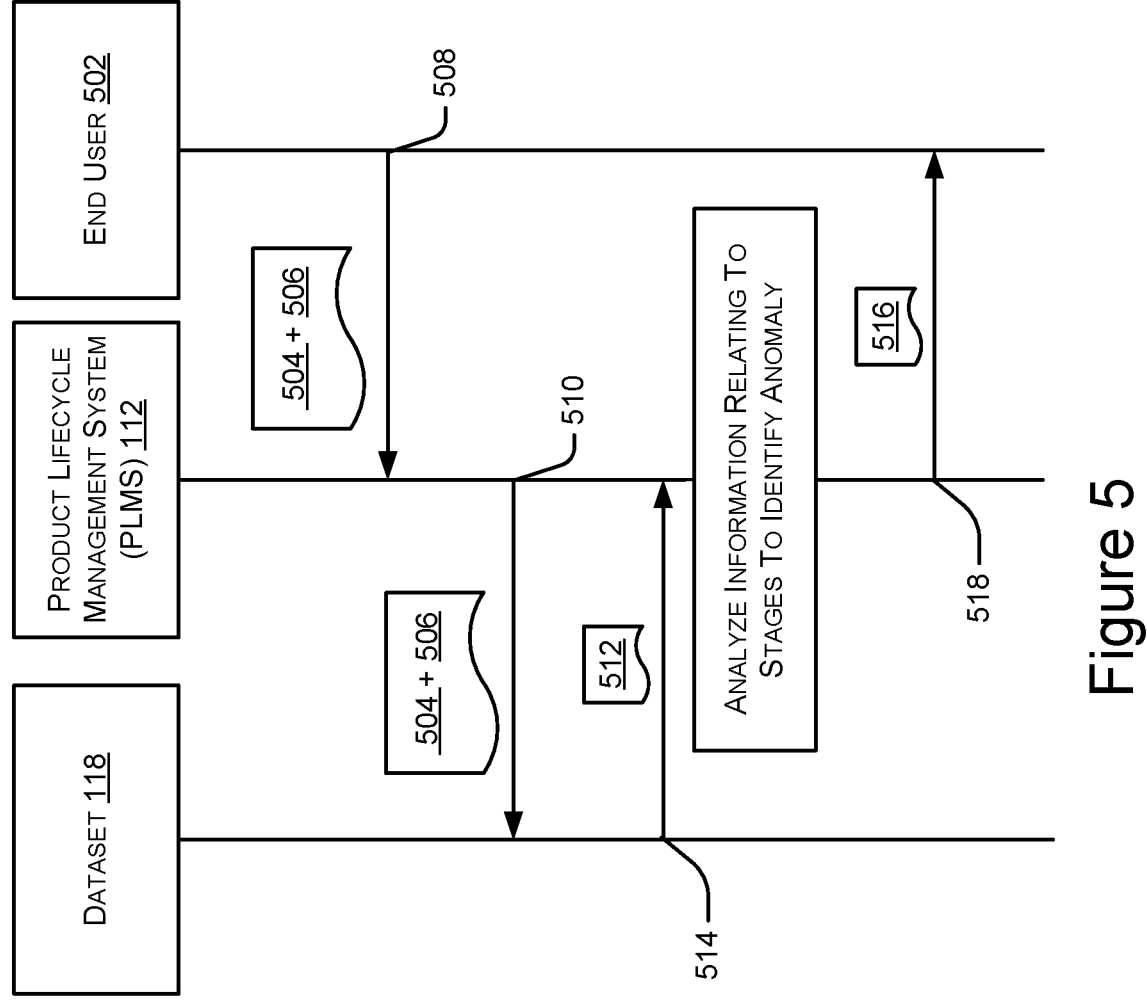
FIG. 5 illustrates a signal flow in a process to analyze a defect in the product, according to an example of the present subject matter.

FIG. 5 illustrates the signal flow that takes place in order to analyze a defect in the product 106. For instance, at the time of usage of the product, a defect may arise in the product owing to an anomaly that may have occurred during the time the product was in the facility, where, as mentioned earlier, the process to make and deliver the product was carried out. Such anomalies, if any, that may have occurred in the facility at the time of manufacturing, testing or packaging etc. of the product, may be identified based on information relating to the physical conditions at the facility at the time of manufacturing, testing or packaging etc. of the product that is recorded and is available with the PLMS 112.

In an example, the anomaly detection module 310 of the PLMS 112 may receive information relating to the defect 504 in the product 106 along with UI 506 associated with the product 106 from an end user 502 associated with the product 106. For example, the information relating to the defect 504 may be received over the network 116 or through a graphical user interface (GUI) of the PLMS 112 as depicted through signal 508 in FIG. 5.

In an embodiment, the anomaly detection module 310 may query the dataset 118 based on the UI 506 as depicted through the signal 510 and data 512 corresponding to the stages of lifecycle of the product 106 in the facility may be retrieved by the anomaly detection module 310 of the PLMS 112 as indicated through the signal 514. Data 512 corresponding to the lifecycle of the product 106 in the facility may include the first data as received from the RFID tag and the second data indicative of physical conditions at the stage as received from the sensors during the activities of the stage.

In one implementation, the anomaly detection module 310 may analyze the retrieved data 512 to identify if an anomaly has occurred during a stage of the process to make and deliver the product 106 carried out in the facility 102. As described above, to identify an anomaly, the anomaly detection module 310 may determine if any of physical conditions relating to the stages of the process deviated from the corresponding predefined range of values or any incident that may affect the activities carried out at any of the stages or quality of the product 106 occurred in the vicinity of the any of the locations designated for the stages. Alternatively, records of anomalies identified during various stages as recorded in the dataset 118 may also be provided to the PLMS 112. The anomaly detection module 310 of the PLMS 112 may analyze the records of anomalies that may have occurred during a stage in order to determine a root cause of the defect 504, in an example. The anomaly detection module 310 may provide a record of anomaly 516 to end user 502 as indicated through the signal 518.

In an example, the information relating to the defect 504 in the product as received from the end user 502 along with UI 506 may also be provided to the AI model 418 by the PLMS 112. The defect may be correlated with the anomalies recorded against the UI 506 in the dataset 118 to avoid the future occurrence of the anomalies. In an example, depending on the severity of the defect, a severity index may also be assigned to the identified anomalies to optimize the corrective actions during future occurrence of the similar anomalous conditions during a process to make and deliver the product.

FIG. 6 illustrates a method 600 for managing lifecycle of a product in a facility, according to an example. Although the method 600 and may be implemented in a variety of computer-based systems, for the ease of explanation, the present description of the example method 600 to manage the lifecycle of the product is provided in reference to the above-described PLMS 112.

The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine readable instructions, or combination thereof.

It may be understood that blocks of the method 600 may be performed by programmed computing devices. The blocks of the method 600 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 6, at block 602, a product lifecycle management system receives a first data from an RFID tag. In an example, the communication module 308 of the PLMS 112 receives the first data from through a RFID reader communicatively coupled to the RFID tag. As explained, various stages of a process to make and deliver the product is carried out in a facility such as facility 102 and constitute a lifecycle of the product 106 in the facility. Each stage is carried out at a designated location within the facility. A RFID tag 108 is coupled to the product 106 to receive information about the product 106 and the stage of the process the product is undergoing. The first data corresponds to plurality of signals received by the RFID reader 114 during at least one stage of the lifecycle of the product 106 in the facility 102 from the RFID tag 108 coupled to the product 106. The plurality of signals indicates at least a current location of the product 106 within the facility 102.

At block 604, based on the current location of the product 106 and pre-stored information relating to locations designated within the facility 102 for each of the at least one stage of the lifecycle of the product 106, the PLMS 112 identifies a current stage of the lifecycle of the product 106 within the facility 102. In an example, the information relating to locations may be prestored in location data 322 of the PLMS 112. In an example, the communication module 308 of the PLMS 112 identifies the current stage of the product 106.

Having identified the current stage of the product in the facility, at block 606, the PLMS 112 receives a second data indicative of physical conditions relating to the current stage at a designated location corresponding to the current location of the product from one or more sensors installed at the designated location. The physical conditions relating to a stage may include parameters or conditions required to carry out activities at the stage such as operating parameters of one or more equipements carrying out the activities. Physical conditions may also include ambient physical conditions such as ambient temperature and incidents occurring in the proximity of the location of the product. One or more sensors installed at the location sense the physical conditions of the corresponding stage. In an example, the communication module 308 of the PLMS 112 receives the second data indicative of physical conditions relating to the current stage as sensed by the one or more sensors.

At block 608, the PLMS correlates the first data and the second data to identify an anomaly relating to the at least one stage of the lifecycle. The PLMS. Each physical condition of a stage has a corresponding predefined range of values that may be defined in SOP. In an example, the anomaly detection module 310 of the PLMS correlates the first data and the second data to identify if any of the physical conditions deviates from a corresponding predefined range of values. A deviation is considered as an anomaly.

FIG. 7 illustrates a method 700 for managing lifecycle of a product in a facility, according to another example of the present subject matter. Although, the method 700 may be implemented in a variety of computer-based systems such as PLMS 112, as is the case with method 600, for the ease of explanation, the present description of the example method 700 to manage the lifecycle of the product is provided in reference to the above-described PLMS 112.

The method 700 may be implemented by a processor(s) or computing device(s) through any suitable hardware, non-transitory machine-readable instructions, or combination thereof. It may be understood that blocks of the method 700 may be performed by programmed computing devices such as the PLMS 112. The blocks of the method 700 may be executed based on instructions stored in a non-transitory computer readable medium, as will be readily understood. The non-transitory computer readable medium may include, for example, digital memories, magnetic storage media, such as magnetic disks and magnetic tapes, hard drives, or optically readable digital data storage media.

The order in which the method 700 is described is not intended to be construed as a limitation, and any number of the described method blocks may be combined in any order to implement the method 700, or an alternative method.

Various stages of a process to make and deliver a product 106 may be carried out in the facility 102 comprising plurality of locations each designated to carry out at least one stage of the process. The stages of the process carried out in the facility 102 form a lifecycle of the product in the facility 102. As discussed above, to manage the lifecycle of the product in the facility, a RFID tag 108 is coupled with the product. When the RFID comes in detection range of a RFID reader 114 installed within the facility 102, the RFID tag 108 transmits a signal to the RFID reader 114.

Referring to FIG. 7, at block 702, a current location of the product 106 in the facility 102 is determined based on the signal received from the RFID tag 108. In an example, the communication module 308 of the PLMS 112 may receive the signal from the RFID reader 114 and determine the current location of the product 106 within the facility 102 based on the signal.

At block 704, a data indicative of physical conditions at the current location from one or more sensors installed at the current location is received. The physical conditions relating to the current location may include conditions for performing activities relating to a stage to be carried out at the current location designated to carry out the stage. The conditions for performing the activities may include operating parameters of one or more equipments carrying out the activities and other parameters used to carry out the activities. Example, of operating parameters of one or more equipments may include temperature or pressure associated with the equipments. Examples of other parameters may include a sequence of activities to be performed. The conditions may also include incidence occurring in the proximity of the product, such as ingress of fumes discharged by a manufacturing plant nearby or the fire accident in the vicinity of the product that may affect the life of the product or activities performed at the stage. In another example, the physical conditions may include ambient conditions such as temperature, air pressure and the like. Each physical condition may have a corresponding predefined range of values that may be specified in the SOP of the process. The sensors installed at the current location may sense the respective condition. For example, temperature of constituents of a medical formulation during a mixing activity may be sensed by a temperature sensor that may be attached to a container of mixer containing constituents during mixing. In an example, the communication module 308 of the PLMS 112 may receive the data from the sensors. For instance, such sensors may communicate with the PLMS 112 using a variety of techniques. For example, a IoT set-up in the facility may link the various sensors installed in the facility to the PLMS 112.

An information relating to locations designated within the facility for each of the at least one stage of the process may be pre-stored. At block 706, based on the prestored information relating to locations, a current stage of the process corresponding to current location of the product may be identified.

As discussed, the product is assigned a UI linked to the RFID tag. The UI uniquely identifies the product and may be created in accordance with guidelines provided by a regulatory authority relating to the product. At block 708, a dataset is created and associated with the UI of the product. The dataset comprises data indicative of physical conditions at the current location corresponding to the current stage and associated with the UI of the product. The dataset may be accessible for future analysis, for example, in a subsequent stage of the lifecycle in the facility and during stages of the lifecycle of the product outside the facility such as shipment, installation, use or maintenance.

Deviation in a physical condition from the corresponding predefined range of values, may introduce an anomaly in the product at the respective stage. Accordingly, at block 710, to identify an anomaly relating to the current stage, one or more physical conditions may be determined to deviate from the corresponding predefined range of values. In an example, mixing of a preservative in a food item in a weight greater than the predefined weight may lead to an unpleasant texture of the food item.

At block 712, the one or more anomalies relating to the current stage may be recorded in the dataset against the UI of the product. At block 714, the dataset may be provided to an AI model for further analysis. The AI model may be trained using the data recorded in the dataset to optimize the process to make and deliver the product by avoiding the future occurrence of the similar anomalous conditions as recorded in the dataset or identified from the data indicative of physical conditions recorded in the dataset. In an example, when a defect occurs in the product during its use, the defect may also be reported to the AI model. The AI model may analyze the dataset to identify if any anomaly occurred during the stages carried out in the facility and correlate the anomalies identified to the defect. Accordingly, the AI model may be trained to identify one or more anomaly during the process to make and deliver the product that lead to a particular defect in the product.

In an example, the AI model may also be trained to optimize the predefined ranges for the physical conditions as defined in the SOP. For example, in case of a food item, a range for ambient temperature for a stage of packaging may be defined as 20 to 30 degree Celsius and no anomaly may be identified during any stage of the process carried out in the facility. However, upon information relating to unpleasant texture of the food item being reported, a root cause of the defect may be determined to be the ambient temperature of 29 degree during the stage of packaging. Based on this analysis, the AI model may optimize the ambient temperature for a stage of packaging as 20 to 25 degree.

FIG. 8 illustrates a method 800 for analyzing a defect in the product, according to an example. Although the method 800 and may be implemented in a variety of computer-based systems, for the ease of explanation, the present description of the example method 800 to manage the lifecycle of the product is provided in reference to the above-described PLMS 112.

The order in which the method 800 is described is not intended to be construed as a limitation, and any number of the described method blocks may be combined in any order to implement the method 800, or an alternative method. Furthermore, the method 800 may be implemented by processor(s) or computing device(s) through any suitable hardware, non-transitory machine readable instructions, or combination thereof.

It may be understood that blocks of the method 800 may be performed by programmed computing devices. The blocks of the method 800 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 8, at block 802, the PLMS 112 receives information relating to a defect in a product 106. The information may comprise a UI of the product 106. As mentioned above, the UI is associated with a RFID tag coupled to the product 106 at one or more stages of a process to make and deliver the product carried out in a facility. The defect may occur in the product during its use. In an example, the anomaly detection module 310 of the PLMS 112 may receive the information relating to the defect, for example, from an end user.

At block 804, the PLMS 112 queries a dataset comprising data indicative of physical conditions corresponding to one or more stages of the process. The dataset is created in accordance with the steps of method 700 as specified in blocks 702 to 708. In an example, the anomaly detection module queries the dataset 118 for the data indicative of the physical conditions.

At block 806, data indicative of physical conditions corresponding to one or more stages may be retrieved, for example, by the anomaly detection module 310 of the PLMS 112. As discussed, the data indicative of physical conditions relating to a stage may include conditions for performing the activities corresponding to the stage as sensed by the sensors installed at the location designated for the stage.

At block 808, the data retrieved may be analyzed, for example, by the anomaly detection module of the PLMS 112, to determine an anomaly relating to any of the one or more stages. To determine the anomaly relating to a stage, the data indicative of physical conditions relating to the stage may be analyzed to identify one or more physical conditions to deviate from corresponding predefined range of values as may be specified in the SOP. The anomaly determined may be considered to cause the defect in the product.

At block 810, the anomaly may be reported, for example, to the end user. In another example, the anomaly may also be reported to other stakeholders, such as a personnel managing the facility. In an example, the anomaly may also be recorded in the dataset 118. In another example, the anomaly along with the defect may be provided to the AI model for further analysis.

Figure 9:
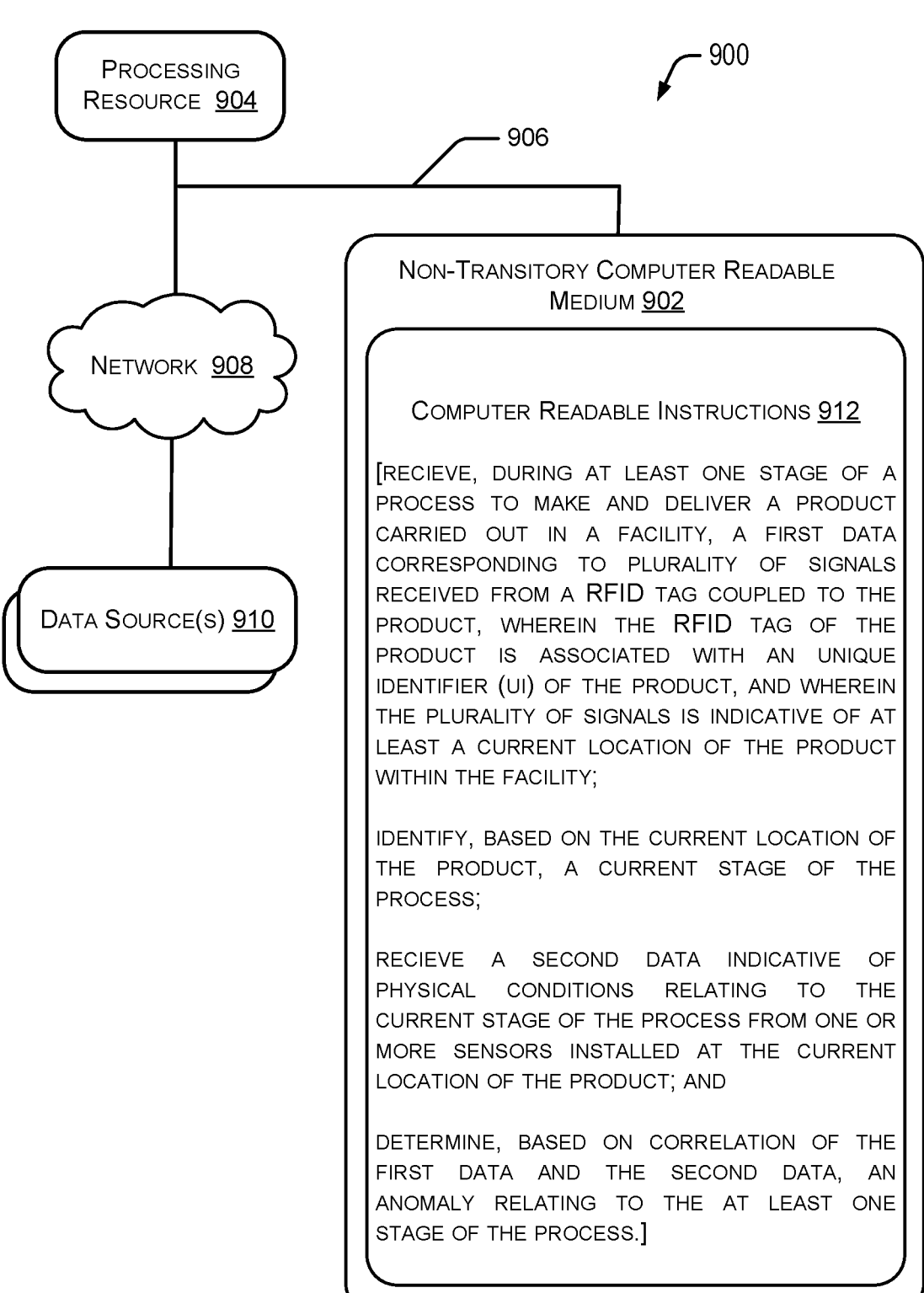
FIG. 9 illustrates a computing environment for managing lifecycle of a product in a facility, according to an example implementation of the present subject matter

FIG. 9 illustrates a computing environment 900 for managing lifecycle of a product in a facility, according to an example. In an example implementation, the computing environment 900 may comprise a computing device, such as the above-described PLMS 112. The computing environment 900 includes a processing resource 904 communicatively coupled to the non-transitory computer-readable medium 902 through a communication link 906. In an example, the processing resource 904 may be a processor of the computing device, such as the processor 202 of the PLMS 112, that fetches and executes computer-readable instructions from the non-transitory computer-readable medium 902.

The non-transitory computer-readable medium 902 can be, for example, an internal memory device or an external memory device. In an example implementation, the communication link 906 may be a direct communication link, such as any memory read/write interface. In another example implementation, the communication link 906 may be an indirect communication link, such as a network interface. In such a case, the processing resource 904 can access the non-transitory computer-readable medium 902 through a network 908. The network 908 may be a single network or a combination of multiple networks and may use a variety of different communication protocols.

The processing resource 904 and the non-transitory computer-readable medium 902 may also be communicatively coupled to data sources 910. In an example implementation, the non-transitory computer-readable medium 902 comprises executable instructions 912 for managing lifecycle of a product in a facility. The lifecycle of the product in the facility corresponds to one or more stages of a process to make and deliver carried out in the facility.

In an example, the instructions 912 cause the processing resource 904 to receive, during at least one stage of the process to make and deliver the product carried out in the facility, a first data corresponding to plurality of signals received from a RFID tag coupled to the product. In an example, the instructions may cause the processing resource to receive data from an RFID reader installed within the facility. As previously explained, the RFID tag of the product is associated with an unique identifier (UI) of the product and the plurality of signals is indicative of at least a current location of the product within the facility.

In an example, the instructions 912 may cause the processing resource 904 to identify, based on the current location of the product, a current stage of the process. As mentioned before, each stage of the process may be carried out at a designated location within the facility and information relating to locations designated within the facility for each of at least one stage of the process may be prestored, for example, in the data sources 910. Accordingly, the processing resource may identify, based on pre-stored information relating to locations, a current stage of the process corresponding to the current location.

In an example, the instructions 912 may cause the processing resource 904 to receive a second data indicative of physical conditions relating to the current stage of the process from one or more sensors installed at the current location of the product. As described above, the physical conditions relating to a stage may comprise ambient conditions at the designated location corresponding to the current stage and conditions for performing activities of the current stage. The ambient conditions may include ambient temperature, humidity, air pressure, fumes and the like. The conditions for performing the activities may include operating parameters of equipments used to carry out the activities and other parameters for performing the activities such as a sequence of activities to be performed. The physical conditions may also include incidents occurring in the vicinity of the product that may affect the product. The physical conditions may be sensed by the corresponding sensor.

Thereafter, the instructions 912 cause the processing resource 904 to determine, based on correlation of the first data and the second data, an anomaly relating to the at least one stage of the process. To determine the anomaly, based correlation of the first data and the second data, the instructions may cause the processing resource 904 to identify one or more physical conditions to deviate from corresponding predefined range of values as specified in the SOP. The SOP may be stored in the data store 910, in an example.

Having determined the anomalies, in an example, the instructions 912 cause the processing resource 904 to cause a corrective action based on the anomaly. In an example, the corrective action may include stopping an activity at the corresponding stage, decreasing a time of failure of the product or discarding the product.

In an example, the instructions 912 cause the processing resource 904 to record the first data, the second data and the anomaly in a dataset against the UI of the product. In an example, the dataset may be stored in the data store 910. A defect may occur in the product, when in use. The defect may arise as a result of an anomaly that may have occurred during a stage of the process. In another example, the instructions 912 may cause the processing resource 904 to receive information relating to a defect in the product. In response to receiving the information, the instructions 912 cause the processing resource 904 to provide the record relating to the at least one stage of the process corresponding to the UI from the dataset. The record may comprise the anomalies recorded in the dataset. The record may also comprise the first data and the second data which may be analyzed to identify an anomaly when the defect occurs.

In an example, the instructions 912 cause the processing resource 904 to provide the dataset to an artificial intelligence (AI) model as training data for further analysis. The AI model may be trained to optimize the process by avoiding identifying the anomalies leading to defects.

In an example implementation, the first data received from the RFID tag and the second data received from the sensors during the stages of the lifecycle of the product in the facility included in dataset may be obtained over the network 908, for example, to identify a root cause of a defect when detected in the product during its use.

Thus, the methods and systems of the present subject matter provide for managing a lifecycle of a product in a facility. Although implementations of managing the life-cycle have been described in a language specific to structural features and/or methods, it is to be understood that the appended claims are not necessarily limited to the specific features or methods described. Rather, the specific features and methods are disclosed as example implementations of managing lifecycle of the product in the facility.

The invention claimed is:

1. A method for managing lifecycle of a product in a facility, the method comprising:

receiving, by a product lifecycle management system (PLMS) incorporated with an artificial intelligence (AI) model, a first data from an RFID reader, wherein the first data corresponds to plurality of signals received by the RFID reader during at least one stage of the lifecycle of the product in the facility from a RFID tag coupled to the product, wherein the plurality of signals is indicative of at least a current location of the product within the facility;

identifying, by the PLMS, based on the current location of the product and pre-stored information relating to locations designated within the facility for each of the at least one stage of the lifecycle of the product, a current stage of the lifecycle of the product;

receiving, by the PLMS, a second data indicative of physical conditions relating to the current stage at a designated location corresponding to the current location of the product from one or more sensors installed at the designated location, wherein the physical conditions comprise at least one or more environmental conditions of the designated location;

automatically correlating, by the PLMS, the first data and the second data to identify an anomaly relating to the at least one stage of the lifecycle of the product based on an identification that one or more of physical conditions relating to the at least one stage of the lifecycle of the product deviates from a corresponding predefined range of values, and wherein a time duration spent by the product in the at least one stage is identified based on the correlation to expose the deviation condition at the current location;

determining, by the PLMS, based on the correlation, one or more operating parameters for each of the physical conditions; and automatically implementing, by the PLMS, one or more corrective actions to the at least one stage of the lifecycle at the current location using the one or more operating parameters.

2. The method as claimed in claim 1, wherein the RFID tag of the product is associated with an unique identifier (UI) of the product by the PLMS, and wherein the method further comprises: recording, corresponding to the UI of the product, the first data, the second data and anomalies at each of the at least one stage of the lifecycle of the product in a dataset.

3. The method as claimed in claim 1, wherein a range of values is predefined for the physical conditions relating to each of the at least one stage of the lifecycle of the product.

4. The method as claimed in claim 1, wherein the at least one stage of lifecycle of the product in the facility comprises one of manufacturing, testing and packaging of the product.

5. The method as claimed in claim 1, wherein the method further comprises causing a corrective action based on the identified anomaly.

6. The method as claimed in claim 1, wherein the physical conditions relating to the current stage comprise ambient conditions at the designated location corresponding to the current stage.

7. The method as claimed in claim 1, wherein the physical conditions relating to the current stage comprise conditions for performing activities of the current stage.

8. A product lifecycle management system (PLMS) for managing products in a facility, the system comprising:

a processor; and a machine-readable storage medium comprising instructions executable by the processor to:

determine a current location of a product in the facility based on a signal received from a RFID tag associated with the product;

receive data indicative of physical conditions at the current location from one or more sensors installed at the current location;

determine any one of the physical conditions at the current location to deviate from a corresponding predefined range of values, wherein the physical conditions comprise at least one or more environmental conditions of the designated location;

identify one or more operating parameters for each of the physical conditions; and automatically cause a corrective action using the one or more operating parameters if any of the physical conditions associated with at least one stage of a lifecycle of the product at the current location deviates from the corresponding predefined range of values.

9. The system as claimed in claim 8, wherein to determine any one of the physical conditions at the current location to deviate, the processor is to:

identify, based on pre-stored information relating to locations designated within the facility for each of at least one stage of a process carried out in the facility to make and deliver the product, a current stage of the process corresponding to the current location; and obtain, a predefined range of values for each of the physical conditions relating to the current stage.

10. The system as claimed in claim 8, wherein the system is coupled to a RFID reader to receive the signal from the RFID tag.

11. The system as claimed in claim 9, wherein the RFID tag of the product is associated with an unique identifier (UI) of the product by the PLMS, and wherein the processor is to record, corresponding to the UI of the product, data indicative of physical conditions at each of the at least one stage of the process carried out in the facility in a dataset.

12. The system as claimed in claim 11, wherein the processor is to provide the dataset to the AI model as training data for further analysis.

13. The system as claimed in claim 8, wherein the processor is to determine, based on a timestamp associated with the signal received from the RFID tag, the time duration of the product being present at the current location.

14. The system as claimed in claim 8, wherein the data indicative of physical conditions at the current location comprises data indicative of ambient conditions of the current location.

15. The system as claimed in claim 8, wherein the data indicative of physical conditions at the current location comprises data indicative of physical conditions of activities at the current location, the activities corresponding to a stage of a process to make and deliver the product carried out at the current location of the facility.

16. A non-transitory computer-readable medium comprising instructions executable by a processing resource incorporated with an artificial intelligence (AI) model to:

receive, during at least one stage of a process to make and deliver a product carried out in a facility, a first data corresponding to plurality of signals received from a RFID tag coupled to the product, wherein the RFID tag of the product is associated with an unique identifier (UI) of the product, and wherein the plurality of signals is indicative of at least a current location of the product within the facility;

identify, based on the current location of the product, a current stage of the process;

receive a second data indicative of physical conditions relating to the current stage of the process from one or more sensors installed at the current location of the product, wherein the physical conditions comprise at least one or more environmental conditions of the designated location;

determine, based on correlation of the first data and the second data, and anomaly relating to the at least one stage of the process of the product based on an identification that one or more of physical conditions relating to the at least one stage of the process deviates from a corresponding predefined range of values, and wherein a time duration spent by the product in the at least one stage is identified based on the correlation to expose the deviation condition at the current location;

determining, by the PLMS, based on the correlation, one or more operating parameters for each of the physical conditions; and automatically implementing, by the PLMS, one or more corrective actions to the at least one stage of the lifecycle at the current location using the one or more operating parameters.

17. The non-transitory computer-readable medium as claimed in claim 16 further comprising instructions executable by the processing resource to:

record the first data, the second data and the anomaly in a dataset against the UI of the product.

18. The non-transitory computer-readable medium as claimed in claim 17 further comprising instructions executable by the processing resource to:

receive information relating to a defect in the product; and provide, in response to receiving the information, the record relating to the at least one stage of the process corresponding to the UI from the dataset.

19. The non-transitory computer-readable medium as claimed in claim 17 further comprising instructions executable by the processing resource to:

provide the dataset to the AI model as training data for further analysis.

20. The non-transitory computer-readable medium as claimed in claim 16 further comprising instructions executable by the processing resource to cause a corrective action based on the anomaly.

\* \* \* \* \*